United States Patent
Meller et al.

(10) Patent No.: US 8,176,009 B2
(45) Date of Patent: May 8, 2012

(54) PERFORMING A PRE-UPDATE ON A NON VOLATILE MEMORY

(75) Inventors: Evyatar Meller, Yad Binyamin (IL); Sharon Peleg, Ramat-HaSharon (IL)

(73) Assignee: Red Bend Ltd., Hod Hasharon (IL)

( * ) Notice: Subject to any disclaimer, the term of this patent is extended or adjusted under 35 U.S.C. 154(b) by 421 days.

(21) Appl. No.: 12/534,297

(22) Filed: Aug. 3, 2009

(65) Prior Publication Data
US 2010/0030823 A1 Feb. 4, 2010

Related U.S. Application Data

(60) Provisional application No. 61/085,879, filed on Aug. 4, 2008.

(51) Int. Cl.
*G06F 7/00* (2006.01)
*G06F 17/00* (2006.01)
(52) U.S. Cl. .......................... 707/623; 707/638; 707/695
(58) Field of Classification Search .................. 707/623, 707/638, 695
See application file for complete search history.

(56) References Cited

U.S. PATENT DOCUMENTS

| | | | |
|---|---|---|---|
| 6,018,747 A | 1/2000 | Burns | |
| 6,023,620 A * | 2/2000 | Hansson | 455/419 |
| 6,278,885 B1 * | 8/2001 | Hubbe et al. | 455/558 |
| 6,546,552 B1 | 4/2003 | Peleg | |
| 6,754,848 B1 | 6/2004 | Froehlich et al. | |
| 6,832,373 B2 * | 12/2004 | O'Neill | 717/171 |
| 7,171,658 B2 * | 1/2007 | Ha | 717/168 |
| 7,797,695 B2 * | 9/2010 | Motta | 717/168 |
| 2002/0112135 A1 * | 8/2002 | Playe | 711/162 |
| 2003/0163508 A1 | 8/2003 | Goodman | |
| 2003/0163805 A1 * | 8/2003 | Hata et al. | 717/173 |
| 2004/0078793 A1 | 4/2004 | Bragulla et al. | |

(Continued)

FOREIGN PATENT DOCUMENTS
WO WO2004/114130 12/2004
(Continued)

OTHER PUBLICATIONS
U.S. Appl. No. 11/997,134, Evyatar Meller.
(Continued)

*Primary Examiner* — Don Wong
*Assistant Examiner* — Merilyn Nguyen
(74) *Attorney, Agent, or Firm* — Buchanan Ingersoll & Rooney PC

(57) ABSTRACT

A method of updating an original version of content to a new version of content, in a non-volatile memory storage device, the method includes: providing a non-volatile content memory storage area arranged to accommodate a full version of content; providing an auxiliary memory area; performing, while at least part of the content memory storage area is not being updated, at least one pre-update operation corresponding to at least one in-place update operation applicable, in an in-place update, on the part of the content memory storage area; storing, while at least part of the content memory storage area is not being updated, at least one result of the performed at least one pre-update operation, on the auxiliary memory area; and performing an in-place update of the at least part of the content memory storage area utilizing the at least one result stored on the auxiliary memory area.

15 Claims, 7 Drawing Sheets

U.S. PATENT DOCUMENTS

| | | | |
|---|---|---|---|
| 2005/0055595 A1* | 3/2005 | Frazer et al. | 713/400 |
| 2005/0216530 A1* | 9/2005 | Meller et al. | 707/203 |
| 2006/0004756 A1 | 1/2006 | Peleg | |
| 2007/0255764 A1 | 11/2007 | Sonnier | |
| 2008/0250188 A1* | 10/2008 | Nakanishi et al. | 711/1 |
| 2009/0063798 A1* | 3/2009 | Kasako | 711/162 |
| 2010/0082959 A1* | 4/2010 | Lim | 713/1 |
| 2010/0095047 A1* | 4/2010 | Grandin | 711/102 |

FOREIGN PATENT DOCUMENTS

| | | |
|---|---|---|
| WO | WO2005/003963 | 1/2005 |
| WO | WO2007/023497 | 3/2007 |

OTHER PUBLICATIONS

International search report of the International Searching Authority for PCT/IL2009/000754 dated Feb. 15, 2010.

Written Opinion of the International Searching Authority for PCT/IL2009/000754 dated Feb. 15, 2010.

* cited by examiner

PERFORMING A PRE-UPDATE ON A NON VOLATILE MEMORY

CROSS REFERENCE TO RELATED APPLICATIONS

This U.S. Patent Application claims priority to U.S. Provisional Application No. 61/085,879, filed on Aug. 4, 2008, which is incorporated herein by reference.

BACKGROUND

1. Technical Field

This invention relates to updating content stored in a storage device. More specifically this invention relates to in-place updating an original version of content in a non-volatile storage to an updated version.

2. Discussion of Related Art

It is sometimes required to update content stored in a storage device. For example, if the content is software, or a program (such as an executable file), it is sometimes required to fix a bug existing therein or introduce new features thereto. Yet, the latter example is non-limiting and other types of content may also require updates, such as text, data stored in a database, etc. The terms "old version" or "original version" refer to a version of content before update, and the terms "new version" or "updated version" refer to a version that includes already updated content. In other words, an original version includes "original content" while an updated version includes "updated content". It should be noted that updated content can be further updated. In case of a second update, for example, the updated content of the first update turns to be original content of the second update while new updated content is generated by the second update etc.

A process during which original content is updated yielding updated content is referred to as an "update process". The update process usually requires instructions on how to perform the update. Such instructions constitute together an "update package", wherein each instruction included therein constitutes an "update command". That is an update package is obtained as input, and during the update process, original content is updated to updated content in accordance therewith. This is non-limiting though and sometimes more than one update package can be obtained which together allows the updating of content. Alternatively, instead of an update package being obtained, an update package (or a set of update commands) may be retrieved from a storage or from a database etc. Hence, hereinafter, when referring to the term "obtaining an update package" it should that the update package can be passively obtained or actively retrieved or sometimes an embedded package (e.g., a hard coded set of update commands) can be activated.

One way to update an original version to an updated version is storing the updated version in the storage in addition to the original version. For example, a computer program "prog.exe" is activated whenever a user presses a certain icon on the PC (Personal Computer) windows desktop. In order to update prog.exe it is possible to store the updated version of this file in a different location than the present (original) version, and then reset the path associated with the icon so as to activate the updated version instead of the original version. Later, when it is ascertained that the update process completed successfully, the original version can be deleted safely, releasing the space occupied thereby. In addition to increasing storage consumption, this latter update method requires that the complete updated version be provided to the update process, e.g., in the update package. Such an update package easily becomes huge in size, and if it is required to transmit it to the updatable device via band-width limited communication channels, transmittance may become cumbersome and sometimes even impossible. Therefore, it is preferable that the size of the update package be reduced along with reducing the device's storage consumption.

Another update method, which storage-wise is preferable to the latter method mentioned above, requires transmitting the complete updated version in the update package and simply overwriting original content with updated content. This update method may turn out to be risky and non-reliable, because if the update process fails in the middle of operating, when part of the original version is already overwritten, while only part of the updated version is written to the storage, it is appreciated that the version stored in the storage at the time of interruption may be invalid or inoperable. In this case, provided that the update package is still accessible, the update process may be restarted from the beginning. It is noted that updating content by overwriting the original content with the updated content is commonly referred to in the art as "in-place update", and the like.

One way for reducing the size of an update package is by including in it information representing the differences between the original and updated content. Such an update package is sometimes referred to also as a "difference", a "difference result" or a "delta". The update process, upon operating in accordance with a delta, applies it to the original content, hence producing the updated content. Deltas may be produced using the known in the art differencing algorithms (such as "GNU diff") in a naive manner, though such deltas tend to be rather large.

The size of the delta being considered, there are methods trying to reduce the size thereof. For example, U.S. Pat. No. 6,546,552 ("Difference extraction between two versions of data-tables containing intra-references", published 2003), which is incorporated herein by reference in its entirety, discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WIPO Publication No. WO 2004/114130 ("Method and system for updating versions of content stored in a storage device", published 2004), which is incorporated herein by reference in its entirety, discloses another system and method for generating a compact update package between an old version of content and a new version of content. The system of WIPO Publication No. WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WIPO Publication No. WO 2005/003963 ("Method and system for updating versions of content stored in a storage device", published 2005), which is incorporated herein by reference in its entirety, discloses a system and method for updating versions of content stored in a storage. The system of WIPO Publication No. WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

It was noted before that a certain type of update package is sometimes referred to as a delta, however, this is non-limiting, and as it appears from WIPO Publication No. WO 2004/114130 and WIPO Publication No. WO 2005/003963, an update package may sometimes include a delta therewith, or as another example the update package may include the entire updated version.

Other methods exist in the art which take care of additional considerations involved in the update. Prior to elaborating on other methods these considerations should be pointed out.

It is appreciated that content is normally stored in a storage. A storage can include volatile memory, i.e., volatile storage (such as Random Access Memory RAM, etc.) and/or non-volatile memory, i.e., non-volatile storage (such as a hard disk, flash memory, EPROM (Erasable Programmable Read-Only Memory) and/or EEPROM (Electrically EPROM), etc).

There are storages that are organized in discrete areas, referred to, e.g., as blocks or sectors, wherein one block can include content belonging to more than one file. Hence, if there are, for example, two files stored in a storage, a single block can include several ('x') bytes belonging to a first of the two files, as well as several ('y') bytes belonging to a second of the two files. If the size of a block is 'z' bytes, it is clear that z>=x+y. Yet, those versed in the art would appreciate that writing content into a block affects other content stored therein. That is, if it is required to re-write the content stored in the x bytes of the first file (e.g., during update thereof), due to storage limitations it may be impossible to write only those x bytes, and it may be necessary to write the content of all the z bytes to the storage. This can be done, for example, by reading content stored in the z bytes from the non-volatile storage to a volatile storage not including blocks, such as RAM, updating only the content stored in the x bytes in the volatile storage (that is, the content of the other z-x bytes is left unaffected therein) and then writing the content of the z bytes back to the non-volatile storage. This limitation characterizes flash memory, for example, wherein it is required to completely delete the present content of a block, before new content (including updated content) can be written thereto, and hard disks where it is not obligatory to delete the complete sector before writing data thereto, but it is required to write the complete content of a block in one writing operation (e.g., it is impossible to write only x bytes when leaving the content stored in the z-x bytes unaffected. In order to leave the z-x bytes unaffected, it is required to store the content thereof in the volatile memory and write them back into the block, together with the x bytes). Hence, the update procedure may require many write operations to the storage including blocks, and it is appreciated that if it is desirable to achieve an efficient update, the update should better be optimized. For example, if x equals, for example, two bytes, than these two bytes should better be updated together, instead of updating the first byte and then the second byte, writing these two bytes separately into the block.

Furthermore, when in-place updating an original version (including original content) to an updated version (including updated content), there are sometimes update commands that use original content in order to generate updated content. For example, it is possible to copy original content from one place to a different place in the storage, wherein this copied content, in its destination place, forms part of the updated version. When copying content to a destination place it should be appreciated that this destination place could have been used before for storing other content (possibly also being part of the original version). Hence, the copied content can overwrite the original content at the destination place. Still further, it is possible that there is another update command that uses the destination place's original content in order to generate updated content. If this other update command is called further to operating in accordance with the first copy command, the destination place's original content can be already overwritten. This situation constitutes a "write before read conflict". Herein below unless otherwise noted the term "conflict" is used for short for "write before read conflict".

Write before read conflicts are a known problem in the art and U.S. Pat. No. 6,018,747 tries to cope therewith. U.S. Pat. No. 6,018,747 ("Method for generating and reconstructing in-place delta files", published 2000), which is incorporated herein by reference in its entirety, discloses a method, apparatus, and article of manufacture for generating, transmitting, replicating, and rebuilding in-place reconstruct software updates to a file from a source computer to a target computer. U.S. Pat. No. 6,018,747 stores the first version of the file and the updates to the first version of the file in the memory of the source computer. The first version is also stored in the memory of the target computer. The updates are then transmitted from the memory of the source computer to the memory of the target computer. These updates are used at the target computer to build the second version of the file in-place.

According to U.S. Pat. No. 6,018,747, when a delta file attempts to read from a memory offset that has already been overwritten, this will result in an incorrect reconstruction since the prior version data has been overwritten. This is termed a write before read conflict. U.S. Pat. No. 6,018,747 teaches how to post-process a delta file in order to create a delta file, minimize the number of write before read conflicts, and then replace copy commands with add commands to eliminate conflicts, thus converting a delta file to an equivalent but larger delta file. A digraph is generated, for representing the write before read conflicts between copy commands. A schedule is generated that eliminates write before read conflicts by converting this digraph into an acyclic digraph.

Another known problem in the art is reliability of the update process, or fail safe update. This problem occurs, for example, when a process of updating an original version is interrupted before its normal termination, such as in a power failure. In such a case, there is a possibility that the content of the block which was being updated during the interruption may become corrupted and contain unexpected content.

It was already mentioned before that when in-place updating blocks of content, an original content of a block sometimes forms part of the input used by the update process. In such a case, if the original block (which is corrupted due to interruption) is required, the update process may be unable to resume. It can be impossible to re-update the corrupted block.

U.S. Pat. No. 6,832,373 ("System and method for updating and distributing information", published 2004), which is incorporated herein by reference in its entirety, for example, tries to provide a fail safe update. It discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and according to U.S. Pat. No. 6,832,373's inventors, may be performed more quickly than through the use of technologies existing when U.S. Pat. No. 6,832,373 was filed.

That is, U.S. Pat. No. 6,832,373 describes using a backup block, while all block update operations are performed thereby using two phases 'two-phase protocol' or 'two-phase commit'. According to U.S. Pat. No. 6,832,373, in a first phase of updating a block, the update process writes the updated content to the backup block and verifies that the content is correctly stored. In a second phase, the update process writes the updated content into its target block to form the updated content of the updated target block (thereby overwriting the original content of the target block). Yet, variations of the same method exist, such as copying the original content of the target block into the backup block in the first phase, and in the second phase in-place updating the target block to store the updated content.

The two phase commit (whether the backed up content is the original content or the updated content) can use only one additional backup block, yet, it is time consuming, since every write operation requires performing two operations (for the two phases). In addition, according to U.S. Pat. No. 6,832,373 every backup operation backs up the complete (original or updated) content of a block in the backup block, and hence if the number of blocks whose content is updated by the update process is n, the total number of operations required for the update process (including update operations and write operations into the backup block) cannot be smaller than 2n. If there are blocks in which content is stored in more than one write operation, the number of operations that the update process is required to perform will be even larger than 2n.

WIPO Publication No. WO 2007/023497 ("Method and system for in-place updating content stored in a storage device", published 2007), which is incorporated herein by reference in its entirety, discloses a system and method for reliable in-place update, performing m block storage operations, including write operations and backup operations, wherein $2<=m<2n$. WIPO Publication No. WO 2007/023497 protects before updating all the original content requiring protection, using a protection buffer (also known as a backup buffer) and the delta file. Thus, WIPO Publication No. WO 2007/023497 resolves write before read conflicts as well as maintaining reliable update.

Another known problem is the difficulty of reversing an in-place update in order to restore original content which has already been overwritten by updated content. U.S. Patent Publication No. 2006/0004756 tries to cope with this problem. U.S. Patent Publication No. 2006/0004756 ("Method and system for in-place updating content stored in a storage device", published 2006), which is incorporated herein by reference in its entirety, describes a method and system for updating a stored version of content stored in a storage using an update package. The update package that includes update commands is adapted for updating an original version of content to an updated version. The updating is carried out in accordance with an update sequence. The method includes determining direction of the updating. If the direction is indicative of forward then the method forward-updates the stored version to the updated version in accordance with the update sequence. If the direction is indicative of roll-back, the method generates a roll-back update sequence opposite to the update sequence and rolls-back the stored version to the original version in accordance with the roll-back update sequence.

Typically in the prior art, not all operations unrelated to the update process which utilize the original or updated content are allowable during the update process. Therefore, there is a loss of efficiency because the duration of the update process constitutes downtime for operations unrelated to the update process.

There is a need in the art, thus, for efficient mechanisms for updating original content of an original version, generating an updated version.

BRIEF SUMMARY

Embodiments of the present invention provide a method of updating an original version of content to a new version of content, in a non-volatile memory storage device the method includes: providing a non-volatile content memory storage area arranged to accommodate a full version of content; providing an auxiliary memory area; performing, while at least part of the content memory storage area is not being updated, at least one pre-update operation corresponding to at least one in-place update operation applicable, in an in-place update, on the part of the content memory storage area; storing, while at least part of the content memory storage area is not being updated, at least one result of the performed at least one pre-update operation, on the auxiliary memory area; and performing an in-place update of the at least part of the content memory storage area utilizing the at least one result stored on the auxiliary memory area.

Embodiments of the present invention provide a system for updating an original version of content to a new version of content, in a non-volatile memory storage device, the system includes: a non-volatile content memory storage area arranged to accommodate a full version of content; an auxiliary memory area; a pre-update module; and an in-place update module, wherein the pre-update module is arranged to: perform while at least part of the content memory storage area is not being updated, at least one pre-update operation, wherein the at least one pre-update operation corresponds with at least one in-place update operation applicable on the content memory storage area; and store at least one result of the performed at least one pre-update operation, on the auxiliary memory area, and wherein the in-place update module is arranged to perform an in-place update of the content memory storage area utilizing the at least one result stored on the auxiliary memory area.

Embodiments of the present invention provide a program storage device readable by machine, tangibly embodying a program of instructions executable by the machine to perform method steps for updating original content stored in a non-volatile memory associated with a device to yield updated content, comprising: performing a pre-update while the device is used in preparation of a subsequent in-place update, wherein the performing a pre-update includes: determining at least one preparation result and storing the at least one determined preparation result in an auxiliary memory whose content is not updated in-place; and performing an in-place update subsequent to the pre-update, wherein the performing an in-place update includes writing updated content in place of original content in the non-volatile memory.

Embodiments of the present invention provide a computer program comprising computer program code means for performing a method of the invention when the program is run on a computer. According to the present invention, there is yet further provided a computer program embodied on a computer readable medium.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
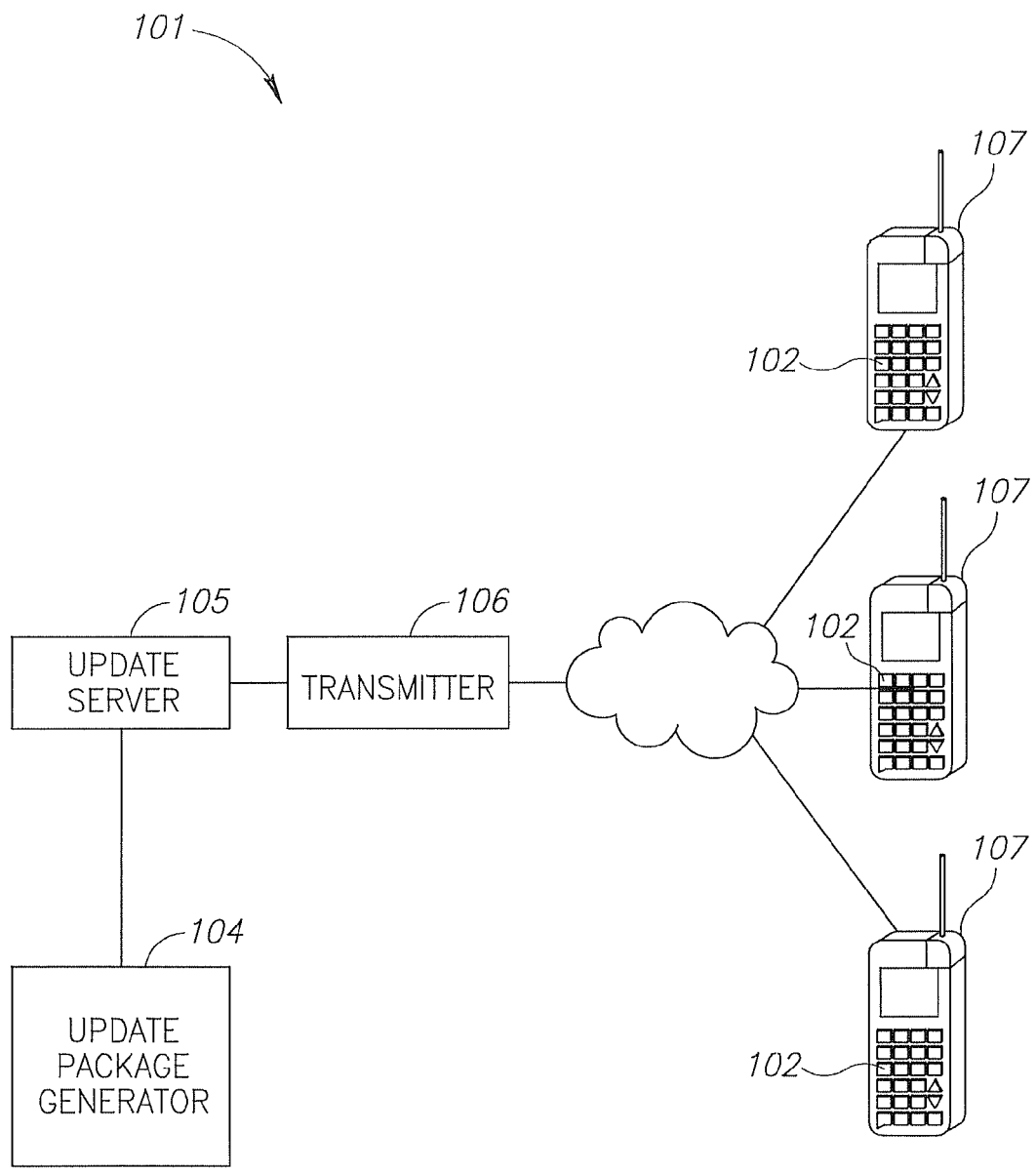
FIG. 1 is a high level schematic illustration of a system for updating content in a cellular network, in accordance with an embodiment of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In the following description elements that are common to more than one figure will be referenced by the same reference numerals.

FIG. 1 is a high level schematic illustration of a system 101 for updating content in a cellular network, in accordance with one embodiment of the invention. Cellular telephones 102, associated with storages 107, execute programs that enable operation of the cellular telephones and/or updating of the cellular telephones. Storages, such as storages 107, are sometimes referred to also as "memories" or "memory units". Programs for a particular cellular telephone 102 are normally stored in files in associated storage 107. In various embodiments, a storage 107 associated with a particular cellular telephone 102 can include volatile memory, i.e., volatile storage, (such as Random Access Memory RAM, etc.) and/or non-volatile memory, i.e., non-volatile storage, (such as a hard disk, flash memory, EPROM (Erasable Programmable Read-Only Memory) and/or EEPROM (Electrically EPROM), etc.).

Some or all of storage 107 associated with a particular cellular telephone 102 may be coupled to the cellular telephone and therefore detachable from the cellular telephone. The coupled storage may be local and/or remote to the cellular telephone. Additionally or alternatively, some or all of storage 107 associated with a cellular telephone 102 may be inside the cellular telephone. It is noted that for simplicity of illustration and description only one storage 107 is illustrated and described per cellular telephone 102, but the reader should understand that any particular associated storage 107 may comprise one or more divisible units. In embodiments where there is a plurality of divisible units comprised in storage 107, the plurality of units may all be detachable from associated cellular telephone 102, may all be within associated cellular telephone 102 or may be divided between unit(s) which are detachable and unit(s) which are within associated cellular telephone 102.

It should be noted that the system 101 illustrated in FIG. 1 is a non-limiting example and the invention is not limited to updating programs. Many other types of content stored in storages require update, such as text, data stored in databases, files stored in the storages, etc. Therefore, hereinafter the term "content" will be used instead of "program". The version of the program currently executing on a cellular telephone or any other content currently applicable to the cellular telephone is referred to, hereinafter, as an "old version", "old content", "original version" "original content", or variations thereof.

Sometimes there is a need to update the programs in order for a telephone 102 to execute a newer version thereof, or to update any other content to a newer version, with the new version referred to, hereinafter, as an "updated version", "updated content", "new version", "new content", or variations thereof. Such an updated version is generated in accordance with an update package (which in some examples includes a delta) that the telephone receives.

A version of content which is not the same as the original version nor the updated version is termed hereinafter "intermediate content" or "intermediate version". For example, in one embodiment an intermediate version can include both updated content and original content. As another example, in one embodiment an intermediate version can include additionally or alternatively content which has been partially transformed on the way to becoming updated content.

According to one embodiment of the invention, an update package is generated in an update package generator 104, operating, for example, in a personal computer (PC) or in any other type of computer. The update package is stored in an update server 105 and transmitted, via a transmitter 106 to the cellular telephones 102. Hence it is clear that the update server, or the update generator includes or has access to a non-volatile memory on which the update package can be stored.

In the same way, the invention is not limited to cellular networks and/or to cellular telephones 102. It should be appreciated that cellular telephones belong to a group referred to as embedded devices. There are other embedded devices, such as Personal Digital Assistants (PDAs), set-top boxes and other consumer electronic devices that are associated with storages for storing content, and sometimes it is required to update the content stored therein. Yet, it is possible to update also content stored in storages associated with non-embedded devices, such as PCs or other computers.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updatable devices" or "devices" will be used hereinafter, and it should be noted that the term "updatable device" or "device" as used herein can refer to any device that is associated with a storage 107 and allows updating content stored therein.

It was previously explained that in order to update content stored in storages 107, update packages are generated, stored in the update server 105 and conveyed to the updatable devices (such as the cellular telephones 102) and the storages 107 associated therewith. Alternatively, it is possible to convey an update package without storing it first in an update server 105. For example, it is possible to convey the update package directly from the update package generator where it is generated. In such a case the machine where the update generator operates, or the update generator itself is considered as the update server 105.

Furthermore, in the example illustrated in FIG. 1 the update package is conveyed via the transmitter 106. This is also non-limiting and any other way applicable for conveying the update package can be used. For example, it is possible to store the update package on a portable storage 107 such as a compact disk or disk-on-key thus allowing an updatable device (such as the telephones 102) to access the update package by reading it therefrom.

In embodiments of the current invention, the updated version is generated through an update process which consists of two sub-processes, namely a "pre-update process" or "pre-update", performed by a "pre-updater" in the updatable device, and an "in-place update process" or "in-place update", performed by an "updater" in the updatable device. Therefore, in some embodiments, the update package may be divided into instructions designated to be executed by the pre-updater and instructions to be executed by the updater. In some of these embodiments the update package may in fact comprise two or more separate packages which are prepared and transmitted separately (for example separate packages for the pre-updater and updater). However in another of these embodiments, there may be single prepared and transmitted package but with designated instructions for the pre-updater and updater. Alternatively, in some embodiments, instructions in the update package may not be assigned between the pre-updater and the updater. For example, in one of these embodiments, the pre-updater performs a pre-update, by executing some or all of the instructions in the update package, in order or out of order. In another of these embodiments, the pre-updater may perform a pre-update which is not based or is only partially based on instructions provided in the update package. For simplicity's sake the single form of update package will be used below and should be understood to connote both embodiments with a single update package and embodiments with a plurality of update packages.

Herein below, for simplicity of description storage 107 and/or the updatable device (such as cellular telephone 102) will be written without reference numerals.

In certain embodiments the storage associated with an updatable device includes both volatile memory and non-volatile memory. For example, it is assumed that the storage includes a non-volatile memory which stores updatable content (i.e., content which may be updated in place), and original content in this non-volatile memory may be updated in-place by new content during an in-place update process. The non-volatile memory which is used for storing the updatable content is termed herein below "updatable content memory". Not all of the content in the updatable content memory is necessarily changed during any particular in-place update and therefore in some cases, some of the content after the completion of an in-place update may be identical to some of the content prior to the in-place update. Typically although not necessarily the updatable content memory is organized in blocks.

In some cases during the in-place update process, not only is the updatable content memory written to, but also volatile memory and/or other non-volatile memory included in the storage are written to. Typically, although not necessarily, the volatile memory to which is written during the in-place update process (and during the pre-update process) is not organized in blocks, for example RAM. The (optional) non-volatile memory which may in some cases be written to during the in-place update process (but which is not updatable content memory) is termed herein below "backup buffer" or "backup memory". In certain embodiments with a backup buffer, the backup buffer may be written to at other times in addition to or instead of during the in-place update process. In some cases, data stored within the backup buffer enables the in-place update process to be reliable. An in-place update process is termed herein "reliable", provided that the in-place update process can be resumed even subsequent to an interruption which caused volatile memory to be erased and possibly a block in storage to be corrupted. It should be appreciated that the content of this block is sometimes corrupted during the interruption and sometimes not. Yet, because it is sometimes impossible to determine or to be certain whether the content thereof is corrupted or not, the content stored in this block is considered as undependable content.

In addition to the memories previously described, part of the memory in the storage is termed herein below "auxiliary memory". The auxiliary memory is memory which is not written to during the in-place update process, and the content of the auxiliary memory is not updated in-place. The auxiliary memory can include for example volatile memory (e.g., RAM, etc.) and/or non volatile memory (e.g., flash, memory extension, mass storage device, disk on key etc.). Auxiliary memory can be local and/or remote. Continuing with the example, in one embodiment a computer which is associated with volatile and/or non-volatile memory and which is coupled by wired or wireless means to the updatable device can function as a remote auxiliary memory for the updatable device. In this embodiment, the updatable device can remotely access the memory associated with the computer through any appropriate standard or proprietary protocol. The term "auxiliary" is used to distinguish this memory for the reader, but should not be construed to imply that the auxiliary memory is necessarily subsidiary or otherwise inferior in nature. In some embodiments, the original intention of the auxiliary memory and the reason for inclusion thereof in the storage may have been for the usage of the user of the updatable device. For example, in one of these embodiments the auxiliary memory may include for instance the user file system. The auxiliary memory is not necessarily organized in blocks, but for simplicity of description in the description below the term "block" is used also with reference to the auxiliary memory and should be understood to mean a block sized area. The pre-updater takes advantage of the existence of the auxiliary memory and writes to the auxiliary memory during the pre-update process. Since a full original version of original content remains stored in updatable content memory during the entire pre-update process, even if the pre-update process is not reliable, (i.e., can not be resumed after an interruption) the in-place update process is not jeopardized.

Because the in-place update process writes new content in place of old content, the updatable content memory includes a combination of the old content and the new content during the in-place update process. Depending on the embodiment, during the in-place update process, the updatable device may or may not be operational (i.e., all operations unrelated to the update which use content in the updatable content memory may be allowable or not all operations unrelated to the update which use content in the updatable content memory may be allowable). If the updatable device is not operational during the in-place update process, then the fact that old and new content coexist during the in-place update process typically although not necessarily does not affect operation. However, in order to not necessarily inconvenience the user, it may in some cases be preferable that the duration of the in-place update process and thus the duration during which the updatable device is not operational be minimized. If the updatable device is operational during the in-place update process, then in order to provide consistent operation for the duration of the in-place update process the fact that old and new content coexist during the update process needs to be addressed. Moreover if the updatable device is operational during the in-place update process, it may be preferable in some cases that the duration of the in-place update process be minimized and/or any performance penalty incurred from running the in-place update process while the device is operational be potentially minimized.

The pre-update process mentioned above and described in more detail below provides an approach regardless of whether the in-place update is performed while the device is operational or not. The pre-update process is executed while the device is operational, prior to and in preparation of the in-place update. The subsequent in-place update may be performed while the updatable device is operational or while not operational, depending on the embodiment. During the pre-update process preparation results (also termed "preparing results" or the like) are written to available auxiliary memory or to a limited amount of available auxiliary memory, depending on the embodiment. Therefore, the preparation results do not overwrite the original content in the updatable content memory. Preparation results may include any results of the pre-update process, and assuming not erased may later be used by the in-place update process (and/or paging process discussed further below). For example, in various embodiments, preparation results may include an intermediate version of content (for example an intermediate version of one or more blocks), an updated version of content (for example an updated version of one or more blocks of content), data which when protected allows one or more characteristic(s) of the in-place update (for example allows the in-place update to be reliable and/or reversible), calculations result(s) (for example required for updating one or more blocks of content, or required for computing data for a backup buffer).

Provided the preparation results are not erased, the pre-update process in some cases allows the in-place update process to be of decreased duration. Additionally or alternatively, in some cases where the in-place update runs while the device is operational and preparation results have not been erased, the pre-update potentially reduces the performance penalty incurred from running the in-place update process while the device is operational. It should be evident that the potential reduction in performance penalty might in some cases depend on the extent of operation during the in-place update process. For example, if the updatable device is idle during the in-place update process (for example because the user is not using the updatable device and no non-update applications are running), the performance penalty may in some cases be minimal and thus the potential reduction in the performance penalty might also be minimal. In contrast, if the user is heavily using the updatable device during the in-place update process, then the performance penalty due to simultaneous in-place update and operation is in some cases potentially larger and thus the potential reduction in the performance penalty might also be larger.

Figure 2:
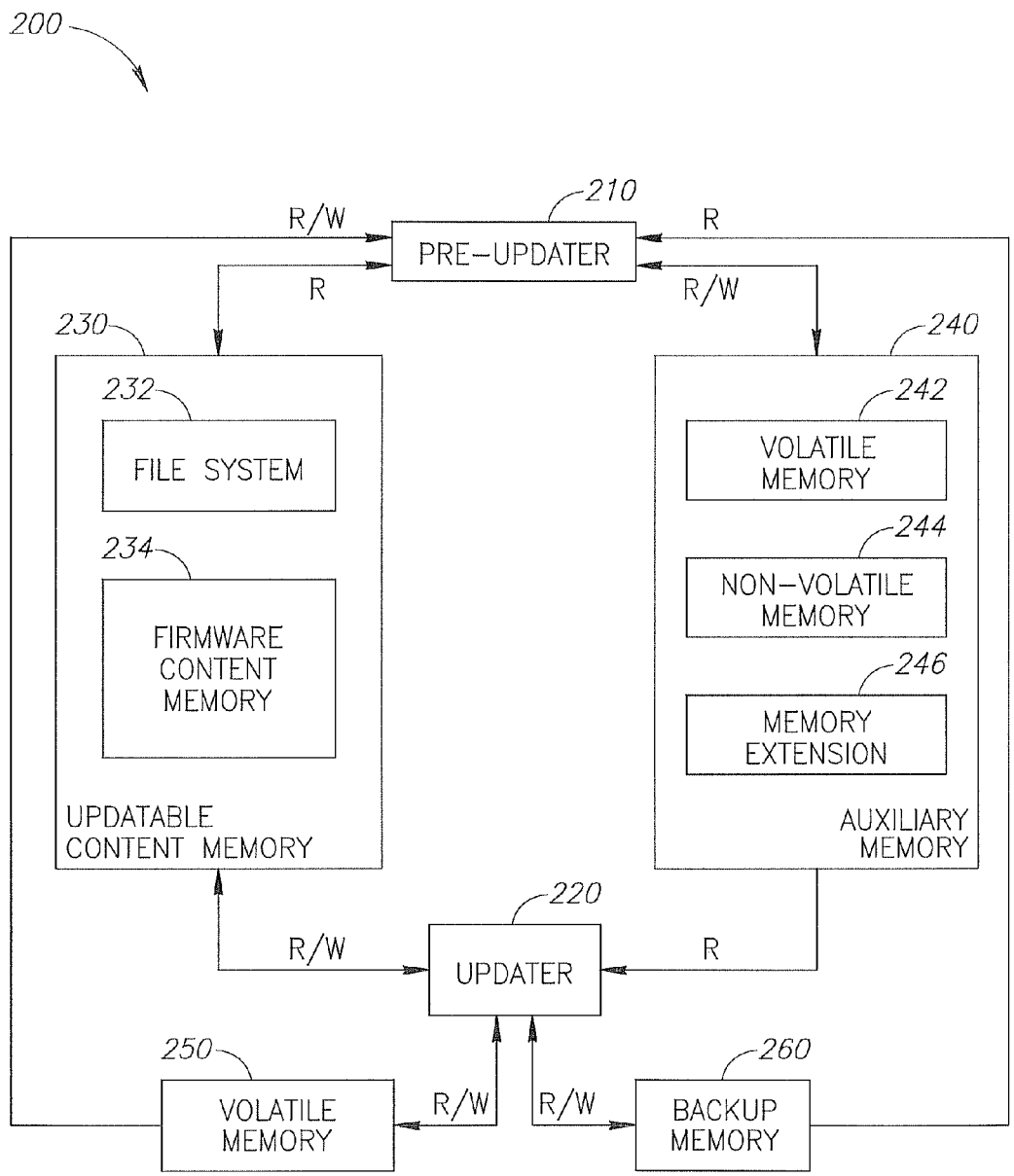
FIG. 2 is a high level schematic illustration of an apparatus for updating content, in accordance with an embodiment of the invention.

Referring now to FIG. 2, FIG. 2 is a high level schematic illustration of an apparatus 200 for updating content, according to an embodiment of the present invention. For example, an updatable device and associated storage thereof may comprise apparatus 200.

In the illustrated embodiment, apparatus 200 includes a pre-updater 210, an updater 220, an updatable content memory 230, an auxiliary memory 240, a volatile memory 250 (e.g., RAM) written to during the update process, and a non-volatile backup buffer 260. In other embodiments, there may be more, less and/or different modules included in apparatus 200. For example, in one embodiment backup buffer (i.e., backup memory) 260 may be omitted, whereas in another embodiment backup memory 260 may be subdivided into separate units for separate storage functions. In other embodiments the functionality described with reference to a particular module may be performed additionally or alternatively by one or more of the other modules.

Each of pre-updater 210 and updater 220 may be made up of any combination of software, firmware and/or hardware capable of performing the functions described and defined herein, principally the pre-update process and in-place update process respectively. In the embodiment illustrated in FIG. 2, pre-updater 210 is configured to perform a pre-update while the updatable device is operational, and updater 220 is configured to perform an in-place update while the updatable device is not operational. In one embodiment, pre-updater 210 and updater 220 may share sub-modules which perform certain common functions.

In one embodiment, updatable content memory 230 includes file system 232, and/or firmware content memory 234. File system 232, for example, is read/write memory. Firmware content memory 234, for example, is a read only memory which stores software. For simplicity of illustration, auxiliary memory 240 is illustrated in FIG. 2 as being local, although as mentioned above, in some cases some or all of auxiliary memory 240 may be remote from pre-updater 210 and updater 220. In one embodiment, auxiliary memory 240 includes volatile memory (e.g., RAM) 242, non-volatile memory (e.g., flash) 244, and/or a non-volatile memory extension 246 (for example which may be external). Backup memory 260 may be used in some cases to protect data for the in-place update process. For example backup memory 260 may protect the update package (e.g., which includes a delta or is of any other type), data which would not be available in updatable content memory 230 when needed during the in-place update process (for example because of write before read conflicts), data which allows the in-place update to be reversible (i.e., rolled back), and/or data which will allow a continuation of the update process if there is an interruption which erases volatile memory. In another embodiment, in addition to or instead of being stored in backup memory 260, the update package may be stored in file system 232, volatile memory 250 and/or in any appropriate volatile or non-volatile memory. Hereinbelow, "update package memory" refers to the memory where the update package is stored, regardless of the type of memory.

It is noted that updatable device and associated storage thereof are not necessarily limited to including apparatus 200 and may include other elements which are known in the art but are not illustrated and described herein since these other elements and do not add to the understanding of the invention.

Figure 3:
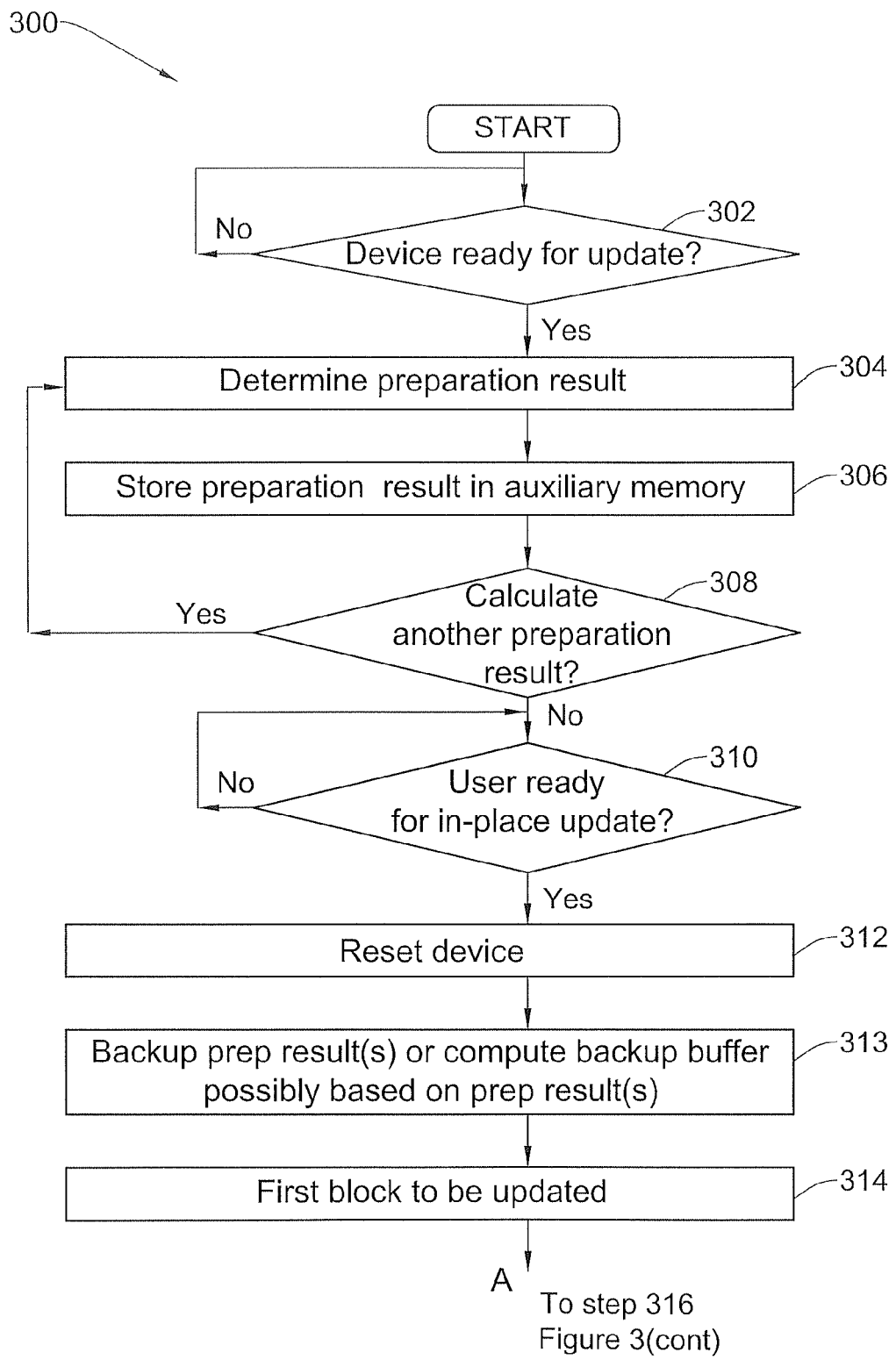
FIG. 3 is a high level flowchart of a method for updating content, in accordance with an embodiment of the invention.
Figure 3:
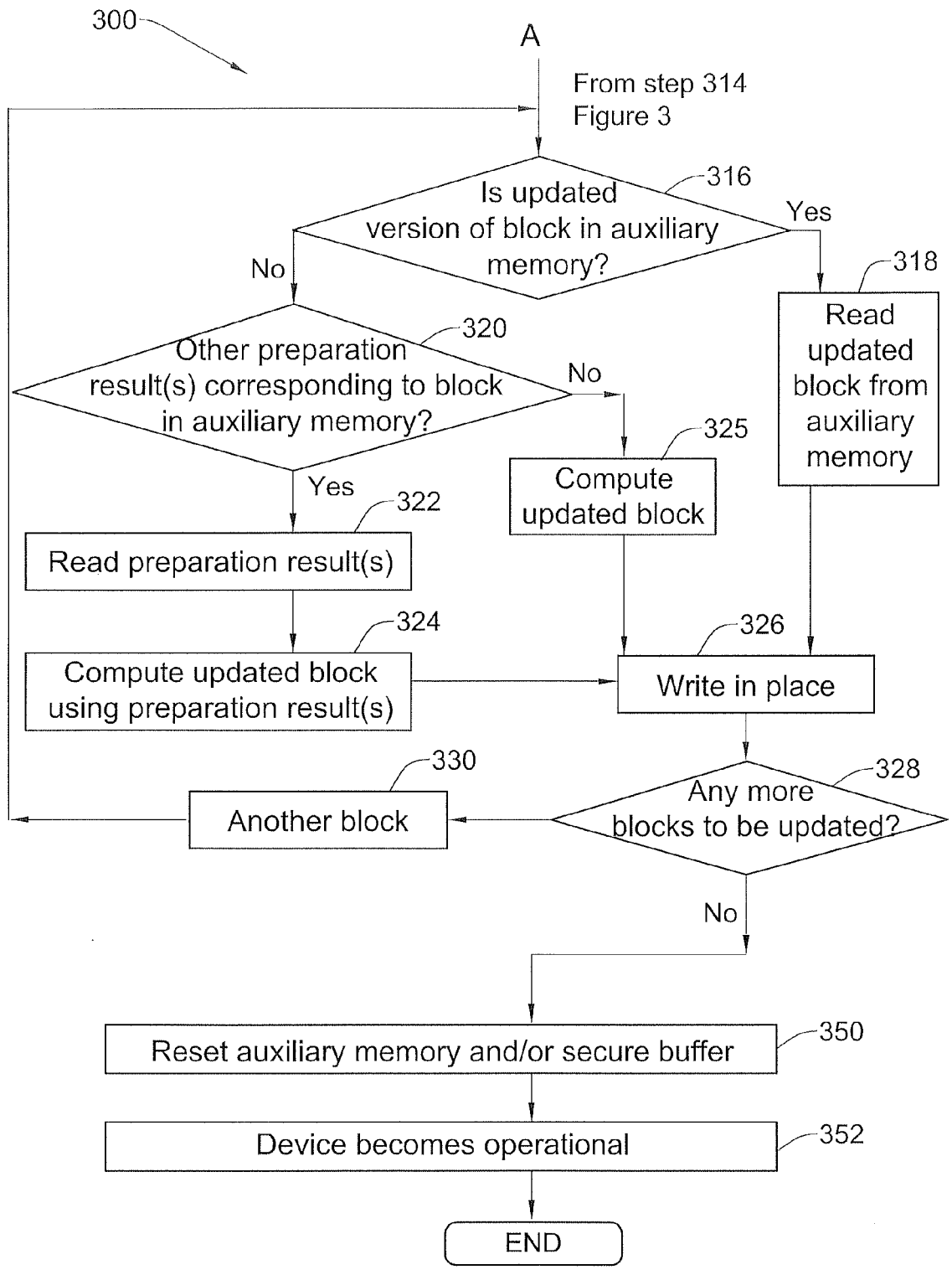

FIG. 3 is a high level schematic flowchart illustrating a method 300 for updating content, according to an embodiment of the present invention. In other embodiments, there may be more, less and/or different stages than illustrated in FIG. 3, the stages may be performed in a different order, and/or stages shown as sequential (or in parallel) may be performed in parallel (or sequentially). In one embodiment, method 300 or a part thereof is executed by apparatus 200.

In the illustrated embodiment, in stage 302, it is decided whether or not the updatable device is ready to be updated, and if the updatable device is not ready, then execution of the remainder of method 300 is deferred.

For example, in one embodiment, the device may check in stage 302 that an update package which provides instructions for the current update process has been obtained (for example received/loaded) and stored in an update package memory which is accessible to updater 220 and preferably also to pre-updater 210. The update package memory may be non-volatile or volatile but it should be evident that storing the update package in a non-volatile memory is more reliable than in a volatile memory, because the update package will then still be accessible in case there is an interruption which causes volatile memory to be erased. For simplicity's sake it is assumed that the update package is stored in a non-volatile update package memory in backup memory 260. It is appreciated that the updatable device may have received the update package previously from the update server 105 and stored the package in the update package memory. Alternatively, the update package may have been loaded for example to the update package memory by any applicable means, such as by copying it from a portable (removable) memory device (e.g., a memory card or compact disc) or from a connected external memory device or by receiving it from the Internet.

As another example, updatable device may alternatively or additionally check in stage 302, that updatable device includes enough memory to run the update process in accordance with the update package. According to one embodiment of this example, if the update package includes an indication of the size of any required non-volatile backup memory, this required backup memory size is compared with the buffer size available in backup memory 260 of the updatable device, deferring execution of the remainder of method 300 if the size of available backup buffer 260 is not enough.

Assuming that the updatable device is ready to be updated, method 300 continues to stage 304, where pre-updater 210 determines a preparation result. In stage 306, pre-updater 210 stores the determined preparation result in auxiliary memory 240. As mentioned above, the preparation result may include any result of the pre-update process including for example, an intermediate version of content (for example an intermediate version of a block of content), an updated version of content (for example an updated version of a block of content), data which when protected allows one or more characteristic(s) of the in-place update (for example allows the in-place update to be reliable and/or reversible), a calculations result (for example which is required for updating a block of content, or required for computing data for a backup buffer), in various embodiments.

The storing in stage 306 is illustrated in FIG. 3 as being performed after each determination iteration of stage 304 (for example separately for each preparation result associated with an instruction in the update package). However, in some cases, a particular storing stage 306 may be performed after stage 304 has been performed a plurality of times (for example only preparation results associated with a plurality of instructions in the update package have been determined). It should be noted that although it is possible that auxiliary memory 240 includes content from the last pre-update which matches original content in updatable content memory 230, pre-updater 210 ignores any such content in auxiliary memory 240 when deciding where to store a preparation result, and does not attempt to overwrite content which matches original content in updatable content memory 230, if existent, with a corresponding preparation result. It is possible, however, that in some cases content in auxiliary memory 240 which matches original content in updatable content memory 230 may by chance be overwritten with a corresponding preparation result. In one embodiment, if original content is needed for determining a preparation result, and copies of that content exist in updatable content memory 230 and auxiliary memory 240 the content is read by pre-updater 210 from updatable content memory 230 rather than from auxiliary memory 240. However in other embodiments the original content may be read from either memory.

In some embodiments, preparation results are not necessarily stored in auxiliary memory 240 (stage 306) in the same sequence that the preparation results were computed. For example, in one of these embodiments, preparation results may be stored wherever there is available space in auxiliary memory 240, where the available space is not necessarily contiguous nor necessarily static during the pre-update process (i.e., in some cases, unrelated to the pre-update process, space in auxiliary memory 240 may be occupied or freed while the pre-update process is running).

In stage 308, pre-updater 210 decides whether or not pre-updater 210 should determine another preparation result.

For example, in some embodiments, the decision of stage 308 is dependent on the availability of space in auxiliary memory 240 that can be used to store preparation results. In these embodiments, the decision is influenced by stage 306 with pre-updater 210 calculating preparation results until there is no longer available space in auxiliary memory 240 to store the preparation results. In one of these embodiments, the available space in auxiliary memory 240 for storing preparation results may be less than the space required to store all of the updated blocks in auxiliary memory, for instance because the actual size of the available auxiliary memory is less or because a limitation is placed on how much of the auxiliary memory can be used by pre-updater 210. As another example, in some embodiments the decision of stage 308 is dependent on whether or not pre-updater 210 has determined the maximum number of preparation results that can be determined in the pre-update process. In these embodiments, the decision is influenced by stage 304 with pre-updater 210 determining preparation results until there are no more remaining preparation results to be determined in the pre-update process. As another example, in some embodiments, the decision is influenced by a combination of stages 304 and 306, for example with pre-updater 210 determining preparation results until the earlier of the completion of the maximum number of preparation results that can be determined in the pre-update process or the depletion of available storage space in auxiliary memory 240. As another example, in some embodiments, the decision of stage 308 is partially dependent on whether or not the user has already expressed a readiness for the in-place update or has otherwise provided an indication which restricts the pre-update (for example a user defined maximum time duration for the pre-update). In one of these embodiments, if the user has expressed a readiness for the in-place update or based on any other user indication pre-updater 210 should stop determining preparation results, then no more preparation results are determined ("no" to stage 308) even if available space has not been exhausted and even if additional preparation results could have potentially been determined in the pre-update process.

It will now be explained various embodiments regarding the preparation results, assuming that the user has not already expressed a readiness for an in-place time update nor otherwise provided an indication which restricts the pre-update. In one embodiment, pre-updater 210 proceeds to follow the instructions of the update package, as though pre-updater 210 were updater 220, except that the updated blocks are stored in auxiliary memory 240 (rather than in updatable content memory 230) until there is no longer available space for storing updated blocks in auxiliary memory 240. In this embodiment, the preparation results include all of the updated blocks (if there is enough space), or a subset of the updated blocks which are comprised in an updated version of the content, the subset including completely updated block(s) and/or intermediate version(s) of block(s).

In other embodiments, additionally or alternatively, the extent of determining preparation results may be explicitly limited, or may be unlimited. In some of these other embodiments, there may be, for example, limitation(s) on the number of update tasks to be performed by pre-updater 210, the type of update tasks to be performed by pre-updater 210, the identity of the update tasks to be performed by pre-updater 210, the order of update tasks to be performed by pre-updater 210 and/or whether a particular update task is to be performed fully or partially by pre-updater 210. Depending on the embodiment, pre-updater 210 may be informed via the update package of the extent that preparation results should be determined, pre-updater 210 may determine the extent without consulting the update package (where the determination may or may not be based on prior knowledge), or pre-updater 210 may determine the extent partly from the update package and partly on its own (where for the latter the determination may or may not be based on prior knowledge). In one embodiment where instead there is no explicit limitation on the extent of determining preparation results, pre-updater 210 may perform all the tasks which are required for update, with pre-updater 210 writing the preparation results (in this embodiment comprising all of the updated blocks) to auxiliary memory 240 rather than to updatable content memory 230.

Some examples of embodiments where there is an explicit limitation on the extent of determining preparation results are now described. In one example, the number of updated blocks to be generated by pre-updater 210 may be limited. In this example, the blocks which are updated by pre-updater 210 may be sequential or not necessarily sequential, depending on the embodiment. In this example, the preparation results include a subset of the updated blocks which are comprised in an updated version of the content. In one embodiment of this example, the number of updated blocks may be limited by limiting the number of instructions in the update package to be performed by pre-updater 210 Continuing with this embodiment, the update package may in some cases designate the number of instructions (and optionally identify the instructions), for example indicating that pre-updater 210 perform only i out of the j instructions included in the update package for generating updated blocks of content, where i<j, and the i instructions relate to k out of the l updated blocks in the updated version (k<l). Continuing with these cases the identity of the i instructions may in some cases be provided in the update package or may otherwise be known to pre-updater 210, for example the first i listed instructions, or the i instructions so marked in the update package. Still continuing with these cases, pre-updater 210 may know that during a pre-update, pre-updater 210 is limited to performing the first i listed instructions, relating to k blocks. In other cases of this embodiment instead of the update package identifying the i instructions or the identity of the i instructions being otherwise known to pre-updater 210, the selection of which i instructions to perform (and possibly the selection of the number of instructions to be performed) may be left to the discretion of pre-updater 210. In these cases, the selection may be random or based on criteria such as for example, the positions of the corresponding k updated blocks within the I blocks and/or the content of the corresponding k updated blocks. In these cases, the instructions selected may be sequential within the update package or not necessarily sequential.

In another example, additionally or alternatively, pre-updater 210 may perform only part (i.e., a subset) of the instructions in the update package associated with each of a plurality of blocks to be updated or may perform only part (i.e., a subset) of the instructions in the update package associated with each of the blocks to be updated. Continuing with this example, in one embodiment, the update package may specify the number and/or which instructions to perform for certain block(s) or pre-updater 210 may know the number and/or which instructions to perform for certain block(s) during a pre-update. In another embodiment of this example, however, additionally or alternatively, pre-updater 210 may determine the number and/or select which instructions to perform for certain block(s). In this embodiment of this example, the selection may be random or based on criteria such as the position and/or content of the instructions. In this embodiment of this example, the instructions selected may be sequential within the update package or not necessarily sequential. In this example, preparation results may include an intermediate version of one or more blocks and/or calculation results required for updating one or more blocks. In various cases of this example, say, pre-updater may perform some or all of the "insert", "delete" and "copy" commands but not the "replace" commands, may perform the first s commands related to each block or to each of a subset of blocks, or may perform any subset of instructions.

In another example where it is assumed that the original blocks were compressed, pre-updater 210 may additionally or alternatively perform decompression of some or all of the original compressed blocks. Continuing with this example, assuming only some of the original blocks will be decompressed by pre-updater 210, in one embodiment the update package may specify that decompression is desired, the number of blocks to decompress, and/or which blocks to decompress, or pre-updater 210 may know that decompression is desired, the number of blocks to decompress, and/or which blocks to decompress, during a pre-update. In another embodiment of this example, however, additionally or alternatively, pre-updater 210 may determine that decompression is desired, the number of blocks to decompress and/or which blocks to decompress, where the selection of the blocks to decompress may be random or based on criteria such as the position of the blocks within the original version and/or content of the blocks and/or where the blocks may be decompressed in the order that the blocks are located in updatable content memory 230 or out of order. In another embodiment of this example, if all original blocks are to be decompressed, the update package may specify that decompression is desired or pre-updater 210 may otherwise know that decompression is desired. In this example, preparations results include an intermediate version of one or more blocks, where the intermediate version includes one or more decompressed blocks.

As another example, additionally or alternatively, pre-updater 210 may determine fully or partially data which when protected, allows one or more characteristic(s) of the in-place update. In this example, pre-updater 210 is informed by the update package or otherwise knows that the in-place update should have certain characteristic(s) and therefore that certain data should be fully or partially determined during a pre-update. For instance, assume an embodiment where the in-place update process has the characteristic of being a reversible process as described in the aforementioned U.S. Publication No. 2006/004756 to Peleg et al, which is hereby incorporated by reference herein. In a reversible update process, if the update process is rolled back, each of the update commands are undone in a reversed order, starting with the last update command in the update package and terminating with the first update command in the update package. In this embodiment, pre-updater 210 may determine and store in auxiliary memory 240 any original content which will be deleted in the in-place update process, so that if the in-place update process is rolled back, the deleted original content can be reinserted. In another instance, assume that the in-place update process additionally or alternatively has the characteristic of being reliable as described in U.S. application Ser. No. 11/997,134 to Meller et al, which is hereby incorporated by reference herein. In a reliable update as per some implementations described in U.S. application Ser. No. 11/997,134, protected error recovery result(s), such as a XOR result(s), enable the recovery of data in case of an interruption of the in-place update process which erases volatile memory. In one embodiment, pre-updater 210 can partially or fully calculate such error recovery result(s) and store such result(s) in auxiliary memory 240. In this example, preparation results therefore include data which when protected allows one or more characteristic(s) of an in-place update, and/or include calculation results towards determining such data.

It should be noted that with the aforementioned embodiments where the extent of determining preparation results is limited there may or may not also be a space limitation. If there is also space limitation and the space limitation is reached before the extent limitation is reached, then the determining of preparation results will be completed earlier than would have been the case if there were no space limitation.

It is also noted, as mentioned above, that if the user has expressed a readiness for the in-place update or otherwise provided an indication which restricts the pre-update prior to the extent limitation and/or space limitation being reached, the determining of preparation results will be completed earlier than would have been the case if the user had not expressed such a readiness or otherwise provided such an indication.

Therefore, in one embodiment where there are both a space limitation and an extent limitation and the user may express a readiness for the in-place update or otherwise provided an indication which restricts the pre-update, the determining of preparation results are completed at the earlier of the space limitation being reached, the extent limitation being reached, or the user expressing a readiness for the in-place update /otherwise providing an indication which restricts the pre-update.

Stages 302 through 308 are performed while the updatable device is operational (i.e., while all operations unrelated to the update which use content in the updatable content memory are allowable). In one embodiment, preparation results written to auxiliary memory 240 by pre-updater 210 are not protected from the user or non-update applications operating in the updatable device. Therefore in this embodiment, some or all of the preparation results may be erased prior to being used in the in-place update process. Alternatively or additionally, in one embodiment preparation results may be written to volatile auxiliary memory 242, and therefore may be erased in case of an interruption which causes volatile memory to be erased or for certain platforms may be corrupted during the reset of stage 312. In another embodiment, preparation results written to auxiliary memory 240 by pre-updater 210 are protected from the user or non-update applications functioning in the updatable device. In this embodiment, assuming auxiliary memory 240 is non-volatile, preparation results are prevented from being erased prior to usage thereof in the in-place update process.

In method 300, the in-place updating of content occurs while the updatable device is not operational (i.e., while not all operations unrelated to the update which use content in the updatable content memory are allowable). Therefore, assuming that the user has not previously expressed a readiness for the in-place update during the pre-update nor otherwise provided an indication which restricts the pre-update (see above), in stage 310, the updatable device determines whether the user is ready for the in-place update. For example in one embodiment, once it has been decided in stage 308 that no other preparation result should be determined, the user may be asked via a user interface of the updatable device whether or not the user is currently ready to update the updatable device. If the user indicates that the user is not ready, then in this embodiment the updatable device remains operational, resetting is deferred, and the updatable device may repeat the question at a later time. It is assumed in this embodiment that either the first time the user is asked or during a subsequent time that the user is asked, the user will agree to a device reset in order to update the device. However, in one embodiment it is possible that the user does not wish to update the device and wishes to retain original content, and that stage 312 is therefore deferred indefinitely.

In the illustrated embodiment, it is assumed that stage 310 is executed, because the user might not like the updatable device to stop being operational at an inconvenient time. However in other embodiments, the updatable device may omit stage 310 and proceed directly to resetting stage 312 after a "no" in stage 308, with or without prior notice to the user that the device will reset. For example, in one of these other embodiments if the answer to stage 308 became "no" because during the pre-update the user requested that the in-place update begin or because of any other user expressed restriction on the pre-update, then stage 310 may be omitted and stage 312 directly performed. As another example, in one of these other embodiments the updatable device may determine when the device should be reset without first consulting the user, and the resetting may occur with or without prior notice to the user. Continuing with the example in some cases, the updatable device may reset during the next recharging of a non-empty battery of the updatable device, and not necessarily soon after a "no" to stage 308.

In stage 312 the updatable device is reset and the in-place update process begins.

In optional stage 313, updater 220 copies certain preparation result(s) from auxiliary memory 240 to backup buffer 260, uses certain preparation result(s) to compute data for backup buffer 260, or computes data for backup buffer 260 not based on preparation results. For example, preparation result(s) comprising data which when protected allows one or more characteristic(s) of the in-place update may be copied to backup buffer 260. As another example, additionally or alternatively, preparation result(s) which comprise calculation result(s) may be used to compute data for storage in backup buffer 260, where this data when protected allows one or more characteristic(s) of the in-place update. As another example, any type of preparation result(s) may be copied in stage 313 by updater 220 from auxiliary memory 240 to backup buffer 260 or used to compute data for storage in backup buffer 260. In another embodiment, stage 313 may be omitted for any of a number of reasons. For example, stage 313 may be omitted because no relevant preparation result(s) are currently stored in auxiliary memory 260. As another example, stage 313 may be omitted because no backup buffer 260 exists. As another example, stage 313 may be omitted because the filling in of the backup buffer 260 occurs at a later stage of the in-place update. Continuing with the example, in one instance preparation result(s) may be copied later in method 300, for example copying from auxiliary memory 240 to backup memory 260 data in an original block which allows rollback and/or other preparation result(s) relating to an original block immediately prior to overwriting the original block in stage 326. Still continuing with the example, in another instance, additionally or alternatively, data for backup memory 260 may be computed based on preparation result(s) or not based on preparation result(s) later in method 300 for example, immediately prior to overwriting an original corresponding block in stage 326.

In stage 314, updater 220 begins updating the first block to be updated. Depending on the embodiment, the first block to be updated may be dynamically selected, or may be the first in an update sequence specified in the update package. The update sequence specified in the update package may have been decided randomly, may have been based on the order of the block in updatable content memory 230, may have been selected in order to limit the potential number of write before read conflicts, or for any other reason. For example, U.S. Pat. No. 6,018,747 to Burns et al., and U.S. Publication No. 20050216530 to Meller et al describe determination of update sequences in update packages, and are hereby incorporated by reference herein. Similarly, in embodiments with dynamic selection, the dynamic selection may be random, may be based on the order of the block in updatable content memory, may be made in order to limit the potential number of write before read conflicts, or may be made for any other reason.

In stage 316, updater 220 determines if the updated version of the block exists in auxiliary memory 240. If the updated version is in auxiliary memory (yes to stage 316), then in stage 318, updater 220 reads the updated block from auxiliary memory 240, and in stage 326 writes the updated block to updatable content memory 230 in place of the original block. Stage 318 and 326 may therefore be considered together to constitute a copy action.

If on the other hand, the updated version of the block does not exist in auxiliary memory 240 (no to stage 316), then in stage 320, updater 220 determines if any other type(s) of preparation result(s) related to the block to be updated exists in auxiliary memory 240. For example in stage 320, updater 220 may check if auxiliary memory 240 contains an intermediate version of the block, calculation result(s), and/or any other type(s) of preparation result(s) relating to the block (other than the updated version of the block which was previously checked for in stage 316). If related preparation result(s) (other than the updated version of the block) exists in auxiliary memory 240, then in stage 322, updater 220 reads the preparation result(s) from auxiliary memory 240. In an embodiment where the update package includes a delta, then depending on the nature of the related preparation result(s) updater 220 may or may not also need to read the original block from updatable content memory 230. In stage 324, updater 220 determines in volatile memory 250 the updated version of the block based on the related preparation result(s), and possibly also based on the original block and/or data in backup buffer 260. In stage 326, the updated version of the block is written in place to updatable content memory 230.

It is possible that in stage 320 it determined there is no preparation result in auxiliary memory 240 corresponding to the block, either because pre-updater 210 did not store such a result, or because such a result was stored but later erased. In this case (no to stage 320), stage 325 is performed with updater 220 generating in volatile memory 250 the updated block without reading any preparation result in auxiliary memory 240. In one embodiment of stage 325, for example in some cases where the update package includes a delta, updater 220 first reads the original block from updatable content memory 230 prior to generating the updated block. The updated block may be generated using any suitable updating procedure, for example based on any of the original block and/or data in backup buffer 260. For example, the updated block may be generated as described in the aforementioned U.S. Pat. No. 6,018,747, U.S. Publication No. 20050216530, U.S. Publication No. 2006/004756, and/or U.S. application Ser. No. 11/997,134. In stage 326, the updated block is written in place to updatable content memory 240.

The invention does not limit the procedure(s) for performing stage 326. Depending on the embodiment, any suitable procedure(s) may be performed. For example, the aforementioned U.S. Pat. No. 6,018,747, U.S. Publication No. 20050216530, U.S. Publication No. 2006/004756, and U.S. application Ser. No. 11/997,134 describe examples of various procedure(s). In some embodiments prior to overwriting an original block, data may be stored into non-volatile back-up memory 260. Examples of what may be stored in backup memory 260 prior to the overwriting an original block include inter-alia: the original or updated block (at least until the updated block has been safely written to updatable content memory 230), any part of the original block which is needed for later updating of other block(s) (thereby preventing write before read conflicts), data which allows an updated block to be rolled back to original content, and/or data which will allow a continuation of the in-place update process if there is an interruption which erases volatile memory. The storage in backup memory 260 may occur immediately prior to the overwriting of stage 326 of the original block (or of the first of a plurality of related original blocks) and/or may occur earlier in method 300, for example at stage 313 as discussed above. However in other embodiments, there may not be a non-volatile backup memory. It should be noted that although storage in non-volatile backup memory 260 may increase reliability in case of interruption, may allow reversibility of the in-place update process, and/or may prevent write before read conflicts, in other embodiments, other techniques may be used additionally or alternatively. For example, other techniques may include inter-alia: storing data in the update package which itself is stored in a (non-volatile) update package memory, protecting an updated block in non-volatile auxiliary memory 244/246 at least until safely written in updatable content memory 230 during the in-place update process, and/or protecting preparation result(s) in non-volatile auxiliary memory 244/246 at least until no longer needed in the in-place update process. Examples of data which may be stored in the update package include inter-alia: add commands which were converted from copy commands, and data which will allow a continuation of the in-place update process if there is an interruption which erases volatile memory. It should be understood that storage in non-volatile backup memory and/or usage of the other described techniques in not required by all embodiments of the invention.

In stage 328 a decision is made whether or not there are more blocks to be updated. If there is at least one other block to be updated (yes to stage 328), then another block is selected to be updated in stage 330. Each time, the next block may be dynamically selected or may be the next block in an update sequence specified in the update package. Stages 316 to 326 are iterated for each of the blocks to be updated.

In other embodiments, the in-place update may be rolled back at any iteration of stage 328 instead of proceeding to update the next block to be updated, for example upon request of the user. In these embodiments, instead of proceeding to update the next block, updater 220 rolls back the updated content starting with the last updated block, undoing each of the commands in the update package in the reverse order and overwriting the updated block with the original content. Updater 220 then proceeds to roll back the updated content for the second to last updated block (in stage 330), continuing until all the updated blocks have been replaced with original content. For example the rollback can proceed as described in the aforementioned U.S. Publication No. 2006/0004756. During the rollback, updater 220 may in some cases use stored preparation result(s) comprising data which is required for the rollback, either reading such preparation result(s) from auxiliary memory 240 or from backup memory 260 (assuming such preparation result(s) were copied there from auxiliary memory 240 in stage 313 or at any stage of the in-place update), depending on the location thereof. For example, in one of these embodiments, assuming for a particular block that in stage 320 there are preparation result(s) required for rollback of that block which are stored in auxiliary memory 240, in stage 322 updater 220 may read the preparation result(s) from auxiliary memory 240, and in stage 324 updater 220 may determine in volatile memory 250 the original (rolled back) version of that block based on the preparation result(s) and possibly also based on the updated version of the block and/or data in backup buffer 260. Similarly, assuming that preparation result(s) comprising data which is required for the rollback were copied from auxiliary memory 240 to backup memory 260 in stage 313 or at any stage of the in-place update, then in stage 325 updater 220 may determine the original (rolled back) version of that block based on the copied data in backup buffer 260 and possibly also based on the updated version of the block and/or other data in backup buffer 260. In stage 326 of this embodiment, the updated block in updatable content memory 230 is overwritten by the original (rolled back) version of the block. In this embodiment, the rollback iterates for all updated blocks, until there are no more updated blocks to rollback to original content (i.e., until the answer is "no" in stage 328). It is possible that in one of these embodiments, not all data required for a rollback was determined and stored in auxiliary memory 240 by pre-updater 210, or that stored data for a rollback was erased in auxiliary memory 240. In this embodiment, updater 220 may in some cases have determined and stored in backup memory 260 at least some of the data for the rollback on its own, for example at stage 313 or at any time prior to overwriting the corresponding original block.

Various embodiments describing how updater 220 determines which preparation result(s) (updated block or otherwise) exist(s) in auxiliary memory 240 are now presented. In some embodiments where the update package fully specifies the extent of determining preparation results by pre-updater 210, the specifications (provided for pre-updater 210) are checked in stage 313, 316 or 320 by updater 220 in order to determine which preparation result(s) (updated block or otherwise) exist(s) in auxiliary memory 240. Similarly, in other embodiments, both pre-updater 210 and updater 220 know the extent that pre-updater 210 should determine preparation results during the current pre-update. If the auxiliary memory where preparation results are stored is non-volatile (or is volatile but no interruption has occurred which erased volatile memory), preparation results are protected, and the pre-update was not terminated in stage 308 due to the readiness of a user for the in-place update, due to any other user expressed indication which restricts the pre-update, or due to auxiliary memory space limitations, then specification in the update package that pre-updater 210 perform a particular task or knowledge that pre-updater 210 should have performed a particular task during the current pre-update, may provide a clear indication to updater 220 that a resulting preparation result is in auxiliary memory 240, whereas omission of such a specification or knowledge that pre-updater 210 should not have performed a particular task during the current pre-update may provide a clear indication that no such preparation result is in auxiliary memory 240. If on the other hand, auxiliary memory is volatile and an interruption has occurred which erased volatile memory, preparation results are not protected, and/or the pre-update was terminated in stage 308 due to readiness of the user for the in-place update, due to any other user expressed indication which restricts the pre-update, or due to space limitations, then non-specification in the update package that pre-updater 210 perform a particular task or knowledge that pre-updater 210 should not have performed a particular task during the current pre-update may provide a clear indication that no resulting preparation result is in auxiliary memory 240. However in this case, specification in the update package that pre-updater 210 perform a particular task or knowledge that pre-updater 210 should have performed a particular task during the current pre-update would not provide a clear indication (since the resulting preparation result may not have had a chance to be saved or may have been saved but since erased), and therefore updater 220 would need to find out whether the resulting preparation result is in auxiliary memory 240 or not. Similarly, there may be embodiments where the update package does not fully specify the extent of determining preparation results for pre-updater 210 and pre-updater 210/updater 220 do not know the extent which pre-updater 210 is supposed to determine preparation results during the current pre-update, for example with pre-updater 210 deciding on the extent of determining preparation results independently or partly based on specifications in the update package. In these embodiments, updater 220 would also need to find out whether the resulting preparation result is in auxiliary memory 240 or not.

In some embodiments, updater 220 is informed whether or not pre-updater 210 stored a resulting preparation result in auxiliary memory 240 by consulting in stage 313, 316 or 320 a "trace" which pre-updater 210 created. The trace indicates which preparation results (updated blocks or otherwise) were determined and stored by pre-updater 210 in the current pre-update. The trace can be created in the update package and accessed by updater 220 or can be created elsewhere and made accessible to updater 220. In one of these embodiments, the trace is created and/or made accessible to updater 220 only if knowledge or specification/non-specification in the update package is not sufficient for updater 220 to determine whether the resulting preparation result is or is not in auxiliary memory 240. In another of these embodiments, however, the trace is routinely created and made accessible to updater 220. If the auxiliary memory where preparation results are stored is non-volatile (or is volatile but no interruption has occurred which erased volatile memory) and preparation results are protected, then the listing or non-listing of a preparation result in the trace may provide a clear indication that a preparation result is (or is not) in auxiliary memory 240. If on the other hand, auxiliary memory is volatile and an interruption has occurred which erased volatile memory, and/or if preparation results are not protected, then non-listing in the trace may provide a clear indication that a preparation result is not in auxiliary memory 240. However in this case, listing in the trace would not provide a clear indication (since the resulting preparation result may have since been erased).

In some embodiments, updater 220 determines whether a preparation result (updated block or otherwise) from the current pre-update is in auxiliary memory 240 in stage 313, 316 or 320 by checking with the memory management of auxiliary memory 240 and/or by checking signatures in auxiliary memory 240. Updater 220 may check with the memory management and/or check signatures for example because knowledge of the tasks of pre-updater 210, checking specifications in the update package and/or checking the trace did not provide a clear indication, because knowledge, specifications in the update package and/or the trace do not exist, because checking with the memory management/checking signatures is more efficient, and/or for any other reason.

Because updater 220 is aware of which preparation result(s) exist(s) in auxiliary memory 240, based on any of the embodiments described above, if computation based on preparation result(s) of the backup buffer in stage 313 or of an updated or rolled back block in stage 324 is required, updater 220 can perform the computation. For example, if the update package specifies the extent of the pre-update, updater 220 knows the extent of the pre-update, or the trace indicates the extent of the pre-update, updater 220 may execute the required tasks to compute the backup buffer in stage 313 or an updated or rolled back block in stage 324. Depending on the embodiment, the update package may comprise instructions for performing the required tasks, or the required tasks may otherwise be known to updater 220.

Once all the blocks which are supposed to have been updated have been updated or conversely once the rollback has been completed and all the updated blocks have been rolled back into original content (no to stage 328), then optionally in stage 350, any auxiliary memory 240 which was used to store preparation results and/or part or all of backup buffer 260 may be freed, for example by the memory management designating the space as available. In other embodiments, stage 350 may be fully or partially omitted, for example omitting the freeing of memory in auxiliary memory 240 if there was anyhow no protection of stored preparation result(s).

In stage 352, the updatable device becomes operational. The updated version of content (or conversely the original version of content if a rollback occurred) in updatable content memory 230 may be used. Method 300 then ends. As mentioned above, the period during which the in-place update process is taking place and the device is not operational, is typically although not necessarily reduced due to the pre-update process, compared to a method which does not include a pre-update.

Figure 4:
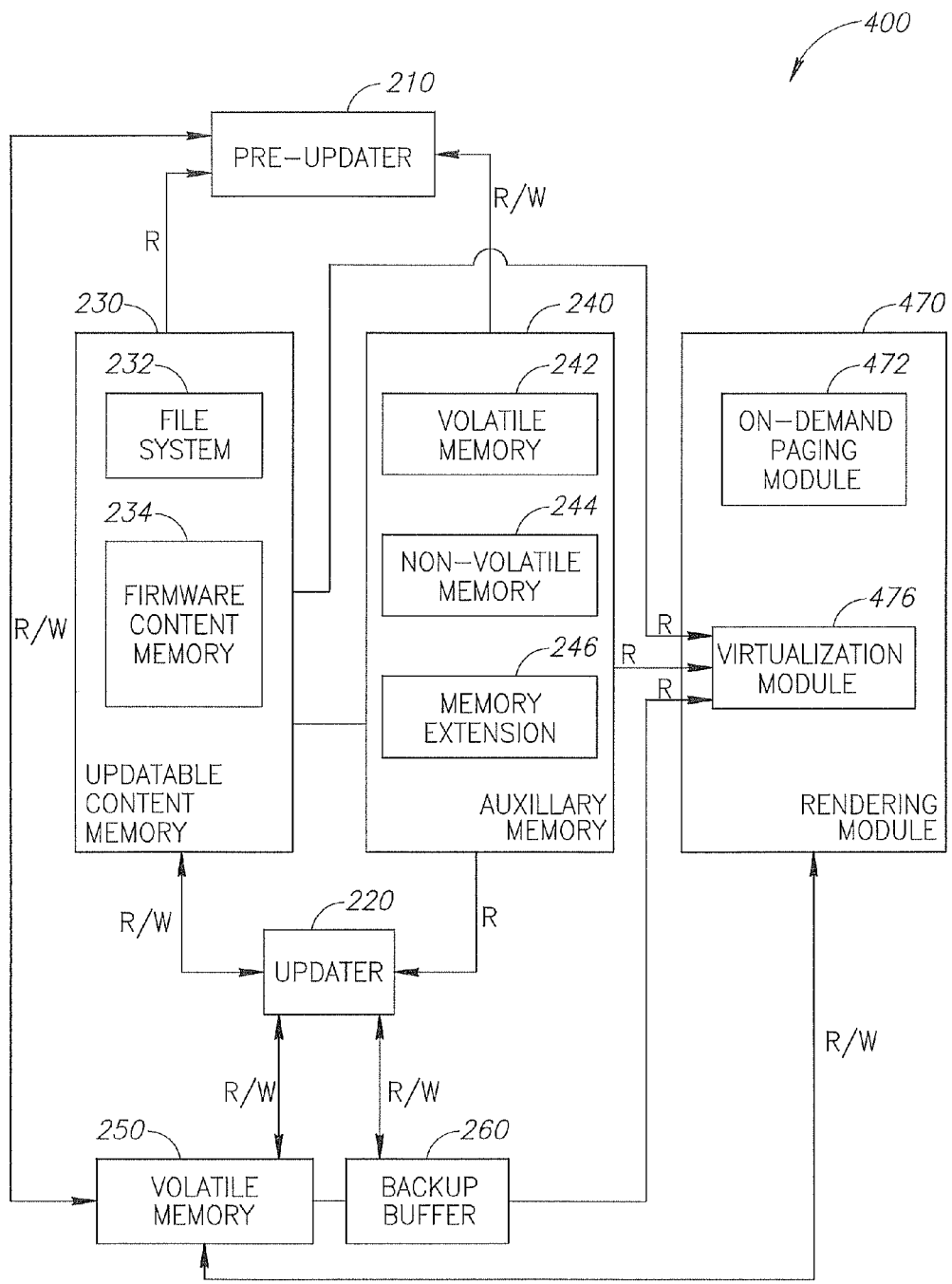
FIG. 4 is a high level schematic illustration of an apparatus for updating content, in accordance with another embodiment of the invention.

FIG. 4 is a high level schematic illustration of an apparatus 400 for updating content, according to another embodiment of the present invention. For example, an updatable device and associated storage thereof may comprise apparatus 400.

In the illustrated embodiment, apparatus 400 includes a pre-updater 210, an updater 420, updatable content memory 230, auxiliary memory 240, volatile memory 250, backup buffer 260, and a rendering module 470. In other embodiments, there may be more, less and or different modules included in apparatus 400. For example, in one embodiment backup buffer 260 may be omitted, whereas in another embodiment backup memory 260 may be subdivided into separate units for separate storage functions. In other embodiments the functionality described with reference to a particular module may be performed additionally or alternatively by one or more of the other modules.

Modules in apparatus 400 which are similar to modules described with reference to apparatus 200 are labeled with the same reference number and the reader is referred for more details on these modules to the description above with respect to FIG. 2.

It is noted that in the embodiment illustrated in FIG. 4, pre-updater 210 and updater 420 are configured to perform a pre-update and in-place update respectively while the updatable device is operational. Updater 420 is labeled with a different number than updater 220 of FIG. 2 because updater 420 performs the in-place update while the updatable device is operational in contrast to updater 220. However depending on the embodiment updater 220 and updater 420 may or may not be identical. Updater 420 may be made up of any combination of software, firmware and/or hardware capable of performing the functions described and defined herein, principally the in-place update process. In one embodiment, pre-updater 210 and updater 420 may share sub-modules which perform certain common functions.

Rendering module 470 may be made up of any combination of software, firmware and/or hardware capable of performing the functions described and defined herein. In the illustrated embodiment, rendering module 470 includes an on demand paging module 472 and a virtualization module 476. Each of on-demand paging module 472 and virtualization module 476 may be made up of any combination of software, firmware and/or hardware capable of performing the functions described and defined herein. In one embodiment, virtualization module 476 may share sub-modules which perform certain common functions with pre-updater 210 and/or with updater 420.

In one embodiment, rendering module 470 is included in the operating system, but this is not necessarily the case. For example, in other embodiments, rendering module 470 may be included in another application, may be stand-alone, etc. In other embodiments, rendering module 470 may include less, more and/or different modules than illustrated in FIG. 4. In other embodiments the functionality described with reference to a particular module of rendering module 470 may be performed additionally or alternatively by one or more other modules. For example, some functionality ascribed to virtualization module 476 in the description below may be performed by paging module 472 in another embodiment, or vice versa.

In the illustrated embodiment, when an attempt is made to access a page by an application unrelated to the update process, or by a user, on demand paging module 472 provides the page to the application or to the user. For example, in various embodiments, paging module 472 may provide the page by loading the page into volatile memory 250, by providing the address of the page, or by any other manner as is known in the art. For simplicity of description, it is assumed that each page whose access is attempted is a block of content in updatable content memory 230. The block whose use is attempted is termed herein below "requested block". The application (unrelated to the update process) or user which is attempting to access the requested block is termed herein below "requester". In the illustrated embodiment, during the in-place update process performed by updater 420, virtualization module 476 supplies the requested block to paging module 472. Depending on the embodiment virtualization module 476 may supply an updated version of the block or the original version of the requested block to on-demand paging module 472. For simplicity of description, it is assumed in the embodiment illustrated in FIG. 5 that virtualization module 476 supplies an updated version of the requested block but in an embodiment where virtualization module 476 supplies an original version, a similar method to that described below with reference to FIG. 5 may be used, *mutatis mutandis*. Paging module 472 then provides the block supplied by virtualization module 476 to the requester.

It is noted that updatable device and associated storage thereof are not necessarily limited to including apparatus 400 and may include other elements which are known in the art but are not illustrated and described herein since these other elements and do not add to the understanding of the invention.

Figure 5:
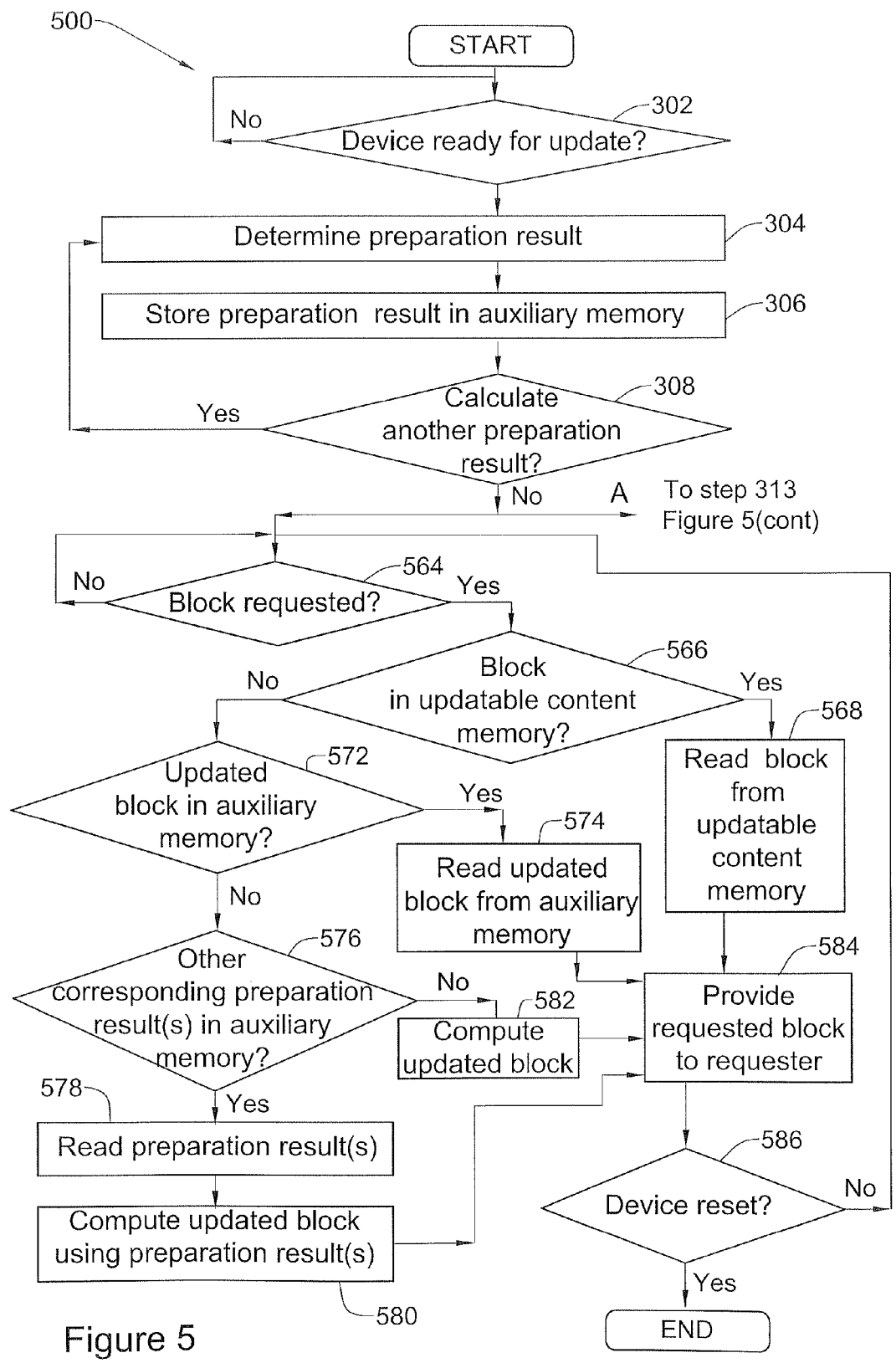
FIG. 5 is a high level flowchart of a method for updating content, in accordance with another embodiment of the invention
Figure 5:
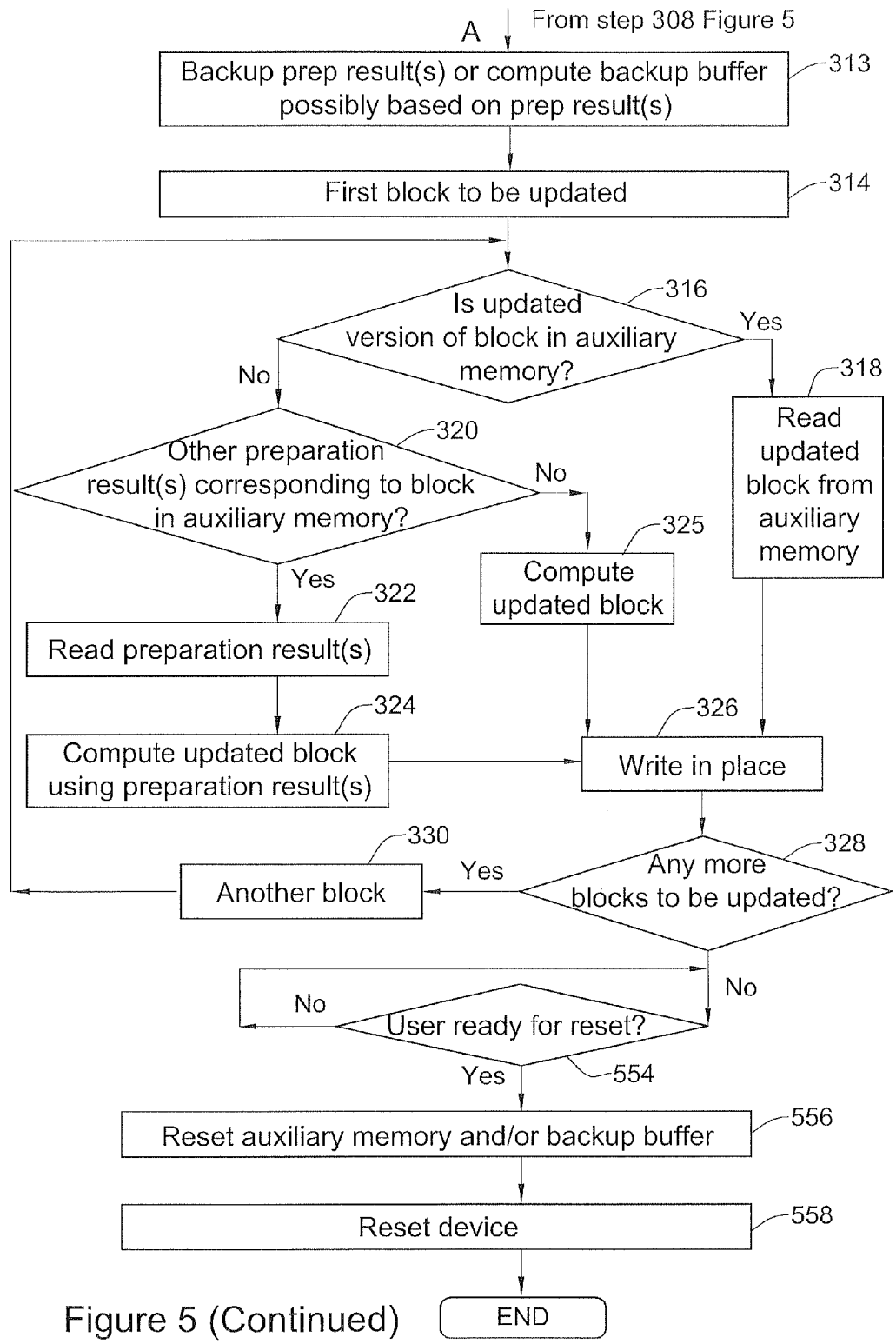

FIG. 5 is a high level flowchart illustrating a method 500 for updating content, according to an embodiment of the present invention. In other embodiments, there may be more, less and/or different stages than illustrated in FIG. 5, the stages may be performed in a different order, and/or stages shown as sequential (or in parallel) may be performed in parallel (or sequentially). In one embodiment, method 500 or a part thereof is executed by apparatus 400.

Stages in method 500 which are similar to stages described with reference to method 300 are labeled with the same reference number and the reader is referred for more details on these stages to the description above with respect to FIG. 3.

In stage 302, it is decided whether or not the updatable device is ready to be updated, and if the updatable device is not ready, then execution of the remainder of method 300 is deferred, as described above. Assuming that the updatable device is ready to be updated, pre-updater 210 performs stages 304 to 308 as described above. However, since method 500 is performed while the device is operational, in some embodiments, it may be less likely that the user would request that the in-place update process begin or otherwise provide an indication that the pre-update be restricted (for example by specifying a maximum time duration for the pre-update) than in method 300. Therefore, in these embodiments it may be more likely in method 500 than in method 300 that the decision in stage 308 of method 500 is not at all dependent on whether or not the user has already expressed a readiness for the in-place update, or otherwise indicated a restriction on the pre-update. Consequently, in these embodiments it may also be more likely that subsequent stages of method 500 compared to method 300 do not consider the possibility that the pre-update had been terminated due to a user express readiness for the in-place update or otherwise indicated restriction on the pre-update. However, in some embodiments of method 500, the user may request that the in-place update begin or otherwise indicate a restriction on the pre-update, and in these embodiments the decision in stage 308 of method 500 may in some cases be at least partly dependent on whether or not the user has already expressed a readiness for the in-place update, or otherwise indicated a restriction on the pre-update.

Method 500 is performed while the device is operational, and therefore once the pre-update process has been completed by pre-updater 210 (no to stage 308), the in-place update process performed by updater 420 may begin. In parallel to the in-place update process, a rendering process is performed by rendering module 470. Although for conciseness, each function in the rendering process is ascribed to a particular module in rendering module 470, in other embodiments a specific function ascribed to a particular module may be additionally or alternatively performed by a different module of rendering module 470. For example, some functions ascribed to virtualization module 476 in the description below may be performed by paging module 472 in other embodiments, or vice versa.

It is noted that both before and during the pre-update process (stages 304 to 308), there is no need for a rendering process which inter-alia checks whether a requested block includes updated or original content in updatable content memory 230, because all blocks in updatable content memory 230 are original blocks until the in-place update process begins. Therefore, before the in-place update process begins, on-demand paging module 472 may work conventionally, reading any requested (original) block from updatable content memory 230 (without requiring the assistance of virtualization module 476) and providing the requested block to the requester. Alternatively, virtualization module 476 may read any original requested block from updatable content memory 230, supply the requested block to on demand paging module 472, and on demand paging module 472 in turn may provide the supplied block to the requester.

Before continuing with the description of the in-place update process and the rendering process, the reasoning for a rendering process which works in parallel to the in-place update process for the illustrated embodiment of FIG. 5 is elaborated upon.

During the in-place update process, there is a combination of old content and new content in updatable content memory 230. Because the device is operational during the in-place update process of method 500, an operation unrelated to the update can use content from updatable content memory 230 (i.e., content can be requested by a requester). It should be evident that it would be preferable that content provided by on-demand paging module 472 to the requester be consistent (i.e., all provided content either be updated content or original content, where in some cases the two may be identical), and therefore not necessarily in the format currently stored in updatable content memory 230 (which could result in some provided content being original content and some being updated content).

In order to supply consistent content to on-demand paging module 472 (which in turn provides that content to the requester), virtualization module 470 may need to update the content of requested blocks which have not yet been updated in updatable content memory 230 but are supposed to be updated in-place, or may need to reverse (i.e., roll back) the content of requested blocks which have already been updated in updatable content memory 230 back to the original content. Assuming the preparation result(s) stored by pre-updater 210 in auxiliary memory 240 (and not erased prior to being used by virtualization module 476) can in some cases potentially reduce the workload of virtualization module 476 in updating or reversing content, the pre-update process can therefore in these cases potentially reduce the performance penalty incurred due to the simultaneous operation of virtualization module 476 and in-place updater 420. It should be noted, however, that not all possible preparation results which may be stored by pre-updater 210 in auxiliary memory 240 are necessarily useful for virtualization module 476 in updating or reversing content and therefore not all stored preparation results would necessarily reduce the workload of virtualization module 476 (nor the potential performance penalty). An example of preparation results which may in one embodiment not be used by a particular virtualization module 476 which reverses content (rather than updating content), includes preparation results relating to updating content (for example updated block, intermediate version of block, calculation result). Another example of preparation results which may in one embodiment not be used by a particular virtualization module 476 which updates content (rather than reverses content) includes data which allows the update process to be rolled back (i.e., reversed). Another example of preparation results which may in one embodiment not be used by virtualization module 476 includes data which is backed up for reliability purposes or calculation results towards computing such data. In these examples, even though virtualization module 476 does not use the preparation results and therefore the workload of virtualization module is not reduced due to the preparations results, if updater 420 does conversely use these preparation results, then the duration of the in-place update process may in some cases be reduced. If the duration of the in-place update process is reduced, it follows that there is a reduction in the time duration during which there is a performance penalty due to simultaneous operation of in-place updater 420 and virtualization module 476 (and/or simultaneous operation of in-place updater 420 and any other non-update device module).

Returning to the description of method 500, stages 313 to 330 are performed as described above, however by updater 420 rather than updater 220.

In stage 554, the updatable device determines if the user is ready for a reset of the device. If the user is ready, then the device is reset in stage 558 for the updated version of content, or for the original version of content if the in-place update process was rolled back. It is noted that when the device is reset in stage 558, the rendering process also terminates (yes to stage 586) as will be described below. If the user is not ready (no to stage 554), resetting is deferred. For example in one embodiment, the user may be told via the user interface of the updatable device that the device has been updated or rolled back to original content but that the device has to be reset, and permission is sought to reset the device. If the user indicates that the user is not ready for a reset, then in this embodiment, the updatable device remains operational, resetting is deferred, and the updatable device may repeat the question at a later time. It is assumed that either the first time the user is asked or during a subsequent time that the user is asked, the user will agree to reset the device, especially considering the relatively short period during which the device is being reset and is non-operational.

In the illustrated embodiment, it is assumed that stage 554 is executed, because the user might not like the updatable device to stop being operational at an inconvenient time. However in other embodiments, the updatable device may omit stage 554 and reset the device after a "no" to stage 328, with or without first notifying the user. For example in one of these other embodiments, the updatable device may determine when the device should be reset without first consulting the user, and the reset can occur with or without prior notice to the user. Continuing with the example, in some case, the updatable device may be reset for example during the next recharging of a non-empty battery of the updatable device.

Optionally in stage 556, prior to resetting the device in stage 558, any auxiliary memory 240 which was used to store preparation results and/or part or all of backup buffer 260 may be freed, for example by the memory management designating the space as available. In other embodiments, stage 556 may be partially or fully omitted, for example omitting the freeing of memory in auxiliary memory 240 if there was anyhow no protection of stored preparation result(s).

In parallel to stages 314 to 558, a rendering process is performed by rendering module 470, beginning with stage 564. In stage 564 on demand paging module 472 determines whether or not a block has been requested. If no block has been requested (no to stage 564), on demand paging module 472 waits until a block will be requested. If a block has been requested (yes to stage 564) then in stage 566, virtualization module 476 determines whether the requested block in updatable content memory 230 includes original content or updated content. As mentioned above, in some cases, the content of a block in the updated version may be identical to the original content of that block in the original version.

In some embodiments where updater 420 follows an update sequence specified in an update package, virtualization module 476 has access to the update package (for example which may be stored in backup memory 260), and virtualization module 476 is aware of the last block updated or rolled back in updatable content memory 230 and whether or not the in-place update process has been rolled back. In one of these embodiments in stage 566, virtualization module 476 can check a direction indicator as disclosed in U.S. Publication No. 2006/0004756 to determine whether or not the in-place update process has been rolled back. In one of these embodiments the memory management can identify the last block that was updated or rolled back and virtualization module 476 can consult the memory management in stage 566 in order to determine the last block updated or rolled back. In one of these embodiments, in stage 566 virtualization module 476 can check the update sequence in the update package to find out whether or not the requested block is in the update sequence and therefore scheduled or not scheduled to be updated in the update process, and if scheduled to be updated whether the requested block is earlier or later in the update sequence than the last updated or rolled back block in updatable content memory 230. In this embodiment, virtualization module 476 thereby knows if the requested block has original content which does not need to be updated and will remain the same in the updated version (because the block is not in the update sequence), or if the requested block which is in the update sequence has original or updated content in updatable content memory 230. For example, in some cases, any block later in the update sequence than the last updated or reversed block has original content and any block earlier in the updated sequence has updated content. In one embodiment where updater 420 selects blocks based on an update sequence specified in the update package or in another embodiment where updater 420 selects blocks dynamically, updated and/or original blocks in updatable content memory 230 may be signed by updater 420. Thus, in these embodiments virtualization module 476 can distinguish between updated content blocks and original content blocks in updatable content memory 230 or between differently signed updated content blocks and original content blocks in updatable content memory 230. In one embodiment where updater 420 selects blocks based on an update sequence specified in the update package or in another embodiment where updater 420 selects blocks dynamically, updater 420 may keep a list of updated blocks with the list being accessible to virtualization module 476. Therefore, in these embodiments, virtualization module 476 can consult the list, aware that a requested block if on the list has been updated and if not on the list, has not been updated or has had content reversed back to original content. In one embodiment where updater 420 selects blocks based on an update sequence specified in the update package or in another embodiment where updater 420 selects blocks dynamically, virtualization module 476 can determine that a block which includes original content is not scheduled to be updated in the update process (and therefore will remain the same in the updated version) by verifying that the update package does not include any update commands regarding that block.

If content corresponding to an updated version is to be provided to the requester and the requested block in updatable content memory 230 has content which has been updated or the requested block has content which is identical in the original and updated versions (yes to stage 566), then in stage 568 virtualization module 476 reads the requested block from updatable content memory 230. In stage 584 virtualization module 476 supplies the requested block to on demand paging module 472, and on demand paging module 472 in turn provides the supplied block to the requester. Similarly, in an embodiment where original content is to be provided to the requester, and the requested block has original content in updatable content memory 230 (yes to 566) then virtualization module 476 reads the original requested block from updatable content memory 230 in stage 568. In stage 584, virtualization module 476 then supplies the original block to on demand paging module 472, and on demand paging module 472 in turn provides the supplied block to the requester. In one embodiment, stages 566, 568, and 584 may instead be performed by paging module 472.

If content corresponding to the updated version is to be provided to the requester and the requested block in updatable content memory 230 has original content which differs from what the content of the requested block would be in the updated version (no to stage 566) then in stage 572, virtualization module 476 determines whether or not the updated block is in auxiliary memory 240. If the updated block is in auxiliary memory (yes to stage 572), then in stage 574 virtualization module 476 reads the updated block from auxiliary memory 240. In stage 584 virtualization module 476 supplies the updated block to on demand paging module 472, and on demand paging module 472 in turn provides the supplied block to the requester. In one embodiment, stages 566, 572, 574, and 584 may instead be performed by paging module 472.

If content corresponding to an updated version is to be provided to the requester, the updated block does not exist in updatable content memory 230 nor in auxiliary memory 240 (and the block in updatable content memory 230 has original content which differs from what the content of the block would be in the updated version) (no to stage 572), then in stage 576, virtualization module 476 determines if any other type(s) of preparation result(s) related to the block to be updated exists in auxiliary memory 240. For example, virtualization module 476 may check if auxiliary memory 240 contains an intermediate version of the block, calculation result(s), and/or any other type(s) of preparation result(s) related to the block (other than the updated version of the block which was previously checked for in stage 572). If related preparation result(s) (other than the updated version of the block) exists in auxiliary memory 240, then in stage 578, virtualization module 476 reads the preparation result from auxiliary memory 240. In an embodiment where the update package includes a delta, then depending on the nature of the related preparation result(s), virtualization module 476 may or may not also need to read the original block from updatable content memory 230. In stage 580 virtualization module 476 determines in volatile memory 250 the updated block based on the related preparation result(s) and possibly also based on the original block and/or data in backup buffer 260. In stage 584 virtualization module 476 supplies the updated block to on demand paging module 472, and on demand paging module 472 in turn provides the supplied block to the requester. Similarly, in an embodiment where original content is to be provided to the requester, but the original block does not exist in updatable content memory 230 nor in auxiliary memory 240 (no to 572), then in stage 576, virtualization module 476 determines if preparation result(s) comprising data required for rolling back the block to original content exists in auxiliary memory 240. If rollback data exists in auxiliary memory 240, then in stage 578 virtualization module 476 reads the rollback data from auxiliary memory 240. In an embodiment where the update package includes a delta, then depending on the nature of the rollback data, virtualization module 476 may or may not also need to read the updated block from updatable content memory 230. In stage 580 virtualization module 476 determines in volatile memory 250 the original version of the block based on the rollback data and possibly based also on the updated block and/or data in backup buffer 260. In stage 584, virtualization module 476 supplies the original block to on demand paging module 472, and on demand paging module 472 in turn provides the supplied block to the requester. In one embodiment, stages 566, 572, 576, 578, 580, and 584 may instead be performed by paging module 472.

Various embodiments describing how virtualization module 476 determines which preparation results (updated block or otherwise) exist(s) in auxiliary memory 240 are now presented (For simplicity of description virtualization module 476 is described as making the determination even though paging module 472 may instead do so in various embodiments). In some embodiments where the update package fully specifies the extent of determining preparation results by pre-updater 210, the specifications (provided for pre-updater 210) are checked by virtualization module 476 in stage 572 or 576 in order to determine whether or not a preparation result (updated block or otherwise) associated with a particular block is available in auxiliary memory 240. Similarly in other embodiments, both pre-updater 210 and virtualization module 476 know the extent that pre-updater 210 should determine preparation results during the current pre-update. If the auxiliary memory where preparation results are stored is non-volatile (or is volatile but no interruption has occurred which erased volatile memory), preparation results are protected, and the pre-update was not terminated in stage 308 due to the readiness of a user for the in-place update, due to any other user expressed indication which restricted the pre-update, or due to auxiliary memory space limitations, then specification in the update package that pre-updater 210 perform a particular task or knowledge that pre-updater 210 should have performed a particular task during the current pre-update may provide a clear indication to virtualization module 476 that a resulting preparation result is in auxiliary memory 240, whereas omission of such a specification or knowledge that pre-updater 210 should not have performed a particular task during the current pre-update may provide a clear indication that no such preparation result is in auxiliary memory 240. If on the other hand, auxiliary memory is volatile and an interruption has occurred which erased volatile memory, preparation results are not protected, and/or the pre-update was terminated in stage 308 due to the readiness of the user for the in-place update, due to any other user expressed indication which restricted the pre-update, or due to space limitations, then non-specification in the update package or knowledge that pre-updater 210 should not have performed a particular task may provide a clear indication that a preparation result is not in auxiliary memory 240. However, in this case, specification in the update package that pre-updater 210 perform a particular task, or knowledge that pre-updater 210 should have performed a particular task during the current pre-update would not provide a clear indication (since the resulting preparation result may not have had a chance to be saved or may have been saved but since erased) and therefore virtualization module 476 would need to find out whether the resulting preparation result is in auxiliary memory 240 or not. Similarly, there may be embodiments where the update package does not fully specify the extent of determining preparation results for pre-updater 210 and pre-updater 210/virtualization module 476 do not know the extent which pre-updater 210 is supposed to determine preparation results, for example with pre-updater 210 deciding on the extent of determining preparation results independently or partly based on specifications in the update package. In these embodiments, virtualization module 476 would also need to find out whether the resulting preparation result is in auxiliary memory 240 or not.

In some embodiments, virtualization module 476 is informed whether or not pre-updater 210 stored a resulting preparation result in auxiliary memory 240 by consulting in stage 572 or 576 a "trace" which pre-updater 210 created. The trace indicates which preparation results (updated blocks or otherwise) were determined and stored by pre-updater 210 in the current pre-update. The trace can be created in the update package and accessed by virtualization module 476 or can be created elsewhere and made accessible to virtualization module 476. In one of these embodiments, the trace is created and/or made accessible to virtualization module 476 only if knowledge or specification/non-specification in the update package is not sufficient for virtualization module 476 to determine whether the resulting preparation result is or is not in auxiliary memory 240. In another of these embodiments, however, the trace is routinely created and made accessible to virtualization module 476. If the auxiliary memory where preparation results are stored is non-volatile (or is volatile but no interruption has occurred which erased volatile memory) and preparation results are protected, then the listing or non-listing of a preparation result in the trace may provide a clear indication that a preparation result is (or is not) in auxiliary memory 240. If on the other hand, auxiliary memory is volatile and an interruption has occurred which erased volatile memory and/or if preparation results are not protected, then non-listing in the trace may provide a clear indication that a preparation result is not in auxiliary memory 240. However, in this case, listing in the trace would not provide a clear indication (since the resulting preparation result may have since been erased).

In some embodiments, virtualization module 476 determines whether a preparation result (updated block or otherwise) from the current pre-update is in auxiliary memory 240 in stage 572 or 576 by checking with the memory management of auxiliary memory 240 and/or by checking signatures in auxiliary memory 240. Virtualization module 476 may check with the memory management and/or check signatures for example because knowledge of the tasks of pre-updater 210, checking specifications in the update package and/or checking the trace did not provide a clear indication, because knowledge, specifications in the update package and/or the trace do not exist, because checking with the memory management/checking signatures is more efficient, and/or for any other reason.

Because virtualization module 476 is aware of which preparation result(s) exist(s) in auxiliary memory 240, based on any of the embodiments described above, if computation based on preparation result(s) of an updated block or rolled back block is required, virtualization module 476 can perform the computation. For example, if the update package specifies the extent of the pre-update, virtualization module 476 knows the extent of the pre-update, or the trace indicates the extent of the pre-update, virtualization module 476 may execute the tasks required to compute an updated block or rolled back block based on the preparation result(s). Depending on the embodiment, the update package may comprise instructions for performing the required tasks, or the required tasks may otherwise be known to virtualization module 476.

It is possible that in stage 576 it is determined that there are no preparation results in auxiliary memory 240 corresponding to the block, either because pre-updater 210 did not store such a result, or because such a result was stored and later erased. In this case (no to stage 576), stage 582 is performed with virtualization module 476 generating the updated or rolled back block in volatile memory 250 without reading any preparation result from auxiliary memory 240. In one embodiment of stage 582, for example in some cases where the update package includes a delta, the original block or updated block is first read from updatable content memory 230 prior to generating the updated or rolled back block respectively.

An updated or reversed block may be generated in stage 582 using any suitable updating procedure, for example based on any of the original/updated block and/or data in backup buffer 260. For example, the updated or reversed block may be generated as described in the aforementioned U.S. Pat. No. 6,018,747 and U.S. Publication No. 20050216530, U.S. Publication No. 2006/004756, and/or U.S. application Ser. No. 11/997,134. It is noted that some of the procedures noted in these publications are also valid for stage 582 even though blocks are not usually requested and updated/reversed by virtualization module 476 in a pre-specified update sequence, while in these publications in contrast a pre-specified update sequence is typically although not necessarily followed. For example, similarly to what is described in these publications, as long as content which is required for updating or rolling back the requested block by virtualization module 476 is available (for example in updatable content memory 230 and/or elsewhere), the updating or rolling back of any requested block may be performed by virtualization module 476. Continuing with the example, in one embodiment it is assumed for the sake of ease of understanding that updater 420 follows an update sequence, and that updater 420 protects in backup buffer 260 at least data which is required for rolling back content and/or original data from updated blocks which is needed for the updating of other block(s) later in the update sequence. In this embodiment, it is also assumed that the requester may request blocks from on demand paging module 472 in an arbitrary order, not necessarily in line with the order in which the blocks are being updated/rolled back. In this embodiment, if updated content is desired, updating by virtualization module 476 occurs if the requested block is later in the update sequence than the block currently being updated or rolled back. In this case the virtualization module 476 may update the original content of the requested block if desired, based on the original content in the requested block, the original content in blocks later in the update sequence than the requested block, and/or based on original content which was protected in backup buffer 260 from blocks earlier in the update sequence than the requested block. Similarly in this embodiment, if rolled back original content is desired, rolling back by virtualization module 476 occurs if the requested block is earlier in the update sequence than the block currently being updated or rolled back. In this case, virtualization module 476 may roll back the updated content of the requested block, based on the updated content of the requested block and/or based on data which was protected in backup buffer 260 which allows the requested block to be rolled back to original content.

In stage 584 virtualization module 476 supplies the updated block to on demand paging module 472, and on demand paging module 472 in turn provides the supplied block to the requester. In another embodiment, stages 566, 572, 576, 582, and 584 may be performed by paging module 472.

In stage 586, it is determined whether or not the device has been reset (i.e., whether or not stage 558 has been performed). If the device has been reset, then the rendering process ends. If the device has not been reset then the rendering process iterates back to stage 564, waiting for a request for another block. In one embodiment, a determination of whether the device has been reset may be made any time during the execution of stages 564 to 586, ending the rendering process once the device has been reset or proceeding to the next stage if the device has not been reset.

Once the device has been reset, there is no longer a need for a rendering process which inter-alia checks whether or not a requested block comprises original or updated content in updatable content memory 230, because all blocks whose content differs between the original version and the updated version would have been updated (or rolled back) prior to reset. Therefore, after the device has been reset, on-demand paging module 470 may work conventionally, reading any requested block from updatable content memory 230 (without requiring the assistance of virtualization module 476) and providing the requested block to the requester. Alternatively, virtualization module 476 may read any requested block from updatable content memory 230, supply the requested block to on demand paging module 472, and on demand paging module 472 in turn may provide the supplied block to the requester.

It is noted as an aside that a paging module typically although not necessarily would also be comprised in an updatable device which performs an in-place update when the device is not operational (as in method 300), but a virtualization module would typically although not necessarily not be needed while the in-place update is taking place. Assuming a virtualization module is not needed, the paging module would work conventionally, reading blocks from updatable content memory 230 when the device is operational and providing the requested blocks to the requester. Therefore, while the pre-update process is running, the paging module would read original version blocks from updatable content memory 230. After the in-place update has been completed and the device has again become operational (in stage 352), the paging module would read updated (or rolled back) blocks (or blocks whose content is the same in the original and updated version) from updatable content memory 230.

In the same way, the invention is not limited to cellular networks and/or to cellular telephones 102. It should be appreciated that cellular telephones belong to a group referred to as embedded devices. There are other types of embedded devices, for example: Personal Digital Assistants (PDAs), set-top boxes and other consumer electronic devices which are controlled and operated by a CPU and software and therefore are associated with storages for storing content, and sometimes it is required to update the content stored therein. Such consumer electronic device can be Cameras, e-book readers, Mobile Internet Devices (MID), Navigation systems, car infotainment systems, and more. Embedded device can be also general utility home appliances which are electronically controlled by a CPU and Software, such as washing machines, DVD players, Blue-ray players and other home entertainment systems. Furthermore, embedded devices can medical devices which are controlled by CPU and software, whether outside the human body or inside the human body, such as pacemakers. Embedded devices can also be part of avionic and aerospace control systems involved in guidance and other functions of the craft in which they are embedded in. All these examples of embedded device represent devices associated with storage holding content which sometimes may require updating. There are many more examples of embedded devices and the above provided examples just demonstrate the possible variety and should not be construed as a concise list. Yet, it is possible to update also content stored in storages associated with non-embedded devices, such as PCs or other general purpose computers.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updatable devices" or "devices" will be used hereinafter, and it should be noted that the term "updatable device" or "device" as used herein can refer to any device that is associated with a storage 107 and allows updating content stored therein.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of updating an original version of content to a new version of content, in a non-volatile memory storage device, the method comprising:
   providing a non-volatile content memory storage area arranged to accommodate a full version of content;
   providing an auxiliary memory area;
   performing, while at least part of the content memory storage area is not being updated, at least one pre-update operation corresponding to at least one in-place update operation applicable, in an in-place update, on part of the content memory storage area;
   storing, while at least part of the content memory storage area is not being updated, at least one result of the performed at least one pre-update operation, on the auxiliary memory area; and
   performing an in-place update of the at least part of the content memory storage area utilizing the at least one result stored on the auxiliary memory area.

2. The method of claim 1, wherein the at least one pre-update operation comprises calculations required for the in-place update.

3. The method of claim 1, wherein the at least one pre-update operation results in content required for later copying onto the content memory storage area.

4. The method of claim 1, wherein the performing at least one pre-update operation or the storing at least one result are performed while the content memory storage area is being used.

5. The method of claim 4, wherein the performing an in-place update of the at least part of the content memory storage area comprises at least one of (i) copying content stored on the auxiliary memory area onto the content memory storage area and (ii) utilizing calculations stored on the auxiliary memory area thereby reducing in-place update time.

6. The method of claim 4, further comprising simultaneously performing an in-place update while the content memory storage area is being used; and performing a rendering process that includes provision of requested content from the content memory storage area.

7. The method of claim 6, wherein the provision of content comprises generating the requested content utilizing at least part of the content stored on the auxiliary memory area, in case the requested content is not available on the content memory storage area.

8. A system for updating an original version of content to a new version of content, in a non-volatile memory storage device, the system comprising:
   a non-volatile content memory storage area arranged to accommodate a full version of content;
   an auxiliary memory area;
   a pre-update module; and
   an in-place update module,
   wherein the pre-update module is arranged to: perform while at least part of the content memory storage area is not being updated, at least one pre-update operation,
   wherein the at least one pre-update operation corresponds with at least one in-place update operation applicable on the content memory storage area; and store at least one result of the performed at least one pre-update operation, on the auxiliary memory area, and
   wherein the in-place update module is arranged to perform an in-place update of the content memory storage area utilizing the at least one result stored on the auxiliary memory area.

9. The system of claim 8, wherein the at least one pre-update operation comprises calculations required for the in-place update.

10. The system of claim 8, wherein the at least one pre-update operation results in content required for later copying onto the content memory storage area.

11. The system of one of claims 8, wherein the pre-update module performs the at least one pre-update operation or stores at least one result of the performed at least one pre-update operation while the content memory storage area is being used.

12. The system of claim 11, wherein the in-place updating module is further arranged to at least one of (i) copy content stored on the auxiliary memory area onto the content memory storage area and (ii) utilize calculations stored on the auxiliary memory area thereby reducing in-place update time.

13. The system of claim 11, further comprising a rendering module arranged to perform a rendering process while the in-place update occurs and while the content memory storage area is being used, wherein the rendering process comprises provision of requested content from the content memory storage area.

14. The system of claim 13, wherein the rendering module is further arranged to generate the requested content utilizing at least part of the content stored on the auxiliary memory area, in case the requested content is not available on the content memory storage area.

15. A computer program product implemented on a machine readable storage device, tangibly embodying a program of instructions executable by the machine to perform method steps for updating original content stored in a non-volatile content memory storage area associated with a device to yield updated content, the method comprising:
   performing, while at least part of the non-volatile content memory storage area is not being updated, at least one pre-update operation corresponding to at least one in-place update operation applicable, in an in-place update, on the at least part of the non-volatile content memory storage area arranged to accommodate a full version of content;
   storing, while at least part of the non-volatile content memory storage area is not being updated, at least one result of the performed at least one pre-update operation, on an auxiliary memory area; and
   performing an in-place update of the at least part of the non-volatile content memory storage area utilizing the at least one result stored on the auxiliary memory area.

* * * * *